United States Patent
Lee et al.

(10) Patent No.: US 11,038,547 B2
(45) Date of Patent: Jun. 15, 2021

(54) METHOD FOR IMPROVING WIRELESS COMMUNICATION PERFORMANCE AND ELECTRONIC DEVICE THEREFOR

(71) Applicant: Samsung Electronics Co., Ltd, Suwon-si (KR)

(72) Inventors: Hyangbok Lee, Seoul (KR); Byoung-Ryoul Song, Suwon-si (KR); Taelee Lee, Suwon-si (KR); Soonheung Kwon, Seoul (KR); Min-Seok Kim, Seoul (KR); Won-Seob Kim, Seoul (KR); Yoon-Goo Nam, Yongin-si (KR); Sung-Soo Kim, Suwon-si (KR); Sigwan Kim, Suwon-si (KR); Seung-Hwa Shin, Suwon-si (KR); Taekkyun Choi, Suwon-si (KR); Young Heo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 16/321,413

(22) PCT Filed: Jul. 13, 2017

(86) PCT No.: PCT/KR2017/007504
§ 371 (c)(1),
(2) Date: Jan. 28, 2019

(87) PCT Pub. No.: WO2018/021733
PCT Pub. Date: Feb. 1, 2018

(65) Prior Publication Data
US 2020/0313715 A1  Oct. 1, 2020

(30) Foreign Application Priority Data
Jul. 28, 2016 (KR) .......... 10-2016-0096265

(51) Int. Cl.
*H04B 1/401* (2015.01)
*H04B 7/0404* (2017.01)

(52) U.S. Cl.
CPC .......... *H04B 1/401* (2013.01); *H04B 7/0404* (2013.01)

(58) Field of Classification Search
CPC ...... H04B 1/401; H04B 7/0404; H04B 1/006; H04B 7/0689; H04B 17/12; Y02D 30/70
See application file for complete search history.

(56) References Cited

U.S. PATENT DOCUMENTS

| 8,878,602 B1 | 11/2014 | Hsu et al. |
| 2007/0123207 A1 | 5/2007 | Terlizzi |

(Continued)

FOREIGN PATENT DOCUMENTS

JP   2001-298385 A   10/2001

OTHER PUBLICATIONS

ISA/KR, "International Search Report and Written Opinion of the International Searching Authority," International Application No. PCT/KR2017/007504, dated Nov. 2, 2017, 9 pages.

(Continued)

*Primary Examiner* — Ankur Jain

(57) ABSTRACT

Various examples of the present invention relate to a device and a method for improving wireless communication performance in an electronic device. The electronic device comprises multiple antennas, a communication circuit connected to the multiple antennas, a connector, and at least one processor, wherein the processor checks whether a wired cable is connected through the connector and, if the wired cable is connected through the connector, can perform control such that communication using the multiple antennas corresponding to the connection of the wired cable is performed. Other examples can be possible.

20 Claims, 13 Drawing Sheets

(56) References Cited

U.S. PATENT DOCUMENTS

| | | | |
|---|---|---|---|
| 2012/0142296 A1* | 6/2012 | Cotterill | H04B 7/0805 |
| | | | 455/230 |
| 2013/0002498 A1 | 1/2013 | Man et al. | |
| 2014/0256247 A1* | 9/2014 | Wietfeldt | H04W 76/10 |
| | | | 455/39 |
| 2014/0273856 A1* | 9/2014 | Kyles | H04W 12/08 |
| | | | 455/41.2 |
| 2014/0364064 A1* | 12/2014 | Kwon | H04W 16/28 |
| | | | 455/63.4 |
| 2015/0234763 A1* | 8/2015 | Kline | G06F 13/4022 |
| | | | 710/313 |
| 2016/0037291 A1* | 2/2016 | Sadasivam | H04W 64/00 |
| | | | 455/456.2 |
| 2016/0141746 A1* | 5/2016 | Kim | H01Q 1/50 |
| | | | 343/718 |
| 2016/0141767 A1 | 5/2016 | Zhai et al. | |

OTHER PUBLICATIONS

INTEL, "USB 3.0* Radio Frequency Interference Impact on 2.4 GHz Wireless Devices," White Paper, Apr. 2012, 22 pages.

* cited by examiner

METHOD FOR IMPROVING WIRELESS COMMUNICATION PERFORMANCE AND ELECTRONIC DEVICE THEREFOR

CROSS-REFERENCE TO RELATED APPLICATIONS

This application is a 371 National Stage of International Application No. PCT/KR2017/007504, filed Jul. 13, 2017, which claims priority to Korean Patent Application No. 10-2016-0096265, filed Jul. 28, 2016, the disclosures of which are herein incorporated by reference in their entirety.

BACKGROUND

1. Field

The present disclosure relates to an apparatus and a method for improving wireless communication performance in an electronic device.

2. Description of Related Art

With the development of information communication technology and semiconductor technology, various electronic devices have been developed into multimedia devices for providing various multimedia services. Multimedia services may include at least one of a voice call service, a message service, a broadcasting service, a wireless Internet service, a camera service, and a music reproduction service.

As the quality of service that a user desires is improved, the amount of data that an electronic device must process increases. Accordingly, the electronic device requires a method of increasing a rate of data transmission with an external device.

SUMMARY

An electronic device may increase a speed of wireless communication for transmitting and receiving data to and from an external device through a plurality of antennas (for example, Multiple-Input Multiple-Output (MIMO)).

The electronic device may increase a speed of wired communication for transmitting and receiving data to and from an external device through a Universal Serial Bus (USB) connection of a USB 3.0 or USB 3.1 type. For example, when the electronic device establishes a wired link to an external device through a USB connection of USB 3.0 communication type, the electronic device may transmit and receive data to and from the external device at a maximum speed of 5 Gbps in a band of 2.5 GHz. When the electronic device establishes a wired link to an external device through a USB connection of USB 3.1 communication type, the electronic device may transmit and receive data to and from the external device at a maximum speed of 10 Gbps in a band of 5 GHz.

However, when the electronic device transmits and receives data to and from the external device through the wired link of USB 3.0 or 3.1 communication type, an electromagnetic field may be formed around the wired link. When the connector for the USB connection is adjacent to one or more antennas, the electronic device may have a problem of deterioration of wireless communication performance (for example, reception sensitivity) since the electromagnetic field formed by the wired link acts as noise affecting the wireless communication. For example, when the connector for the USB connection is adjacent to one or more antennas, the electronic device may have deteriorated reception sensitivity of wireless communication due to USB 3.0 communication, as shown in [Table 1].

TABLE 1

| LTE Band | B12 | B20 | B5 | B8 | B3 | B2 | B1 | B7 |
|---|---|---|---|---|---|---|---|---|
| Sensitivity [dBm] without USB 3.0 transfer | −91.2 | −94.3 | −94.6 | −92.6 | −100.3 | −89.3 | −92.9 | −94.2 |
| Sensitivity [dBm] with USB 3.0 transfer | −86.7 | −89.3 | −91.1 | −88.1 | −95.6 | −84.9 | −90.7 | −91.4 |
| Delta | 4.5 | 5.0 | 3.5 | 4.6 | 4.7 | 4.3 | 2.2 | 2.9 |

Referring to [Table 1], when the electronic device transmits and receives data through a wired cable for USB 3.0 communication, a problem of deterioration of the reception sensitivity of at least one antenna may occur due to the influence of the electromagnetic field generated by data transmission/reception.

Various embodiments of the present disclosure may provide an apparatus and a method for reducing deterioration of wireless communication performance (for example, reception sensitivity) attributable to the USB connection in the electronic device.

According to various embodiments of the present disclosure, an electronic device may include a plurality of antennas, a communication circuit connected to the plurality of antennas, a connector, and at least one processor, wherein the processor may perform control to identify whether a wired cable is connected through the connector, and may perform communication using multiple antennas corresponding to the connection of the wired cable when the wired cable is connected through the connector.

According to various embodiments of the present disclosure, a method of operating an electronic device may include an operation of identifying whether a wired cable is connected through a connector of the electronic device, and an operation of, when the wired cable is connected through the connector, performing communication using multiple antennas corresponding to the connection of the wired cable.

According to various embodiments, an electronic device may include a plurality of antennas, a communication circuit connected to the plurality of antennas, a connector, and at least one processor, wherein the processor may perform control to identify whether a wired cable is connected through the connector, and when the wired cable is connected through the connector, perform communication using multiple antennas corresponding to the connection of the wired cable on the basis of the connection direction of the wired cable.

DETAILED DESCRIPTION

Figure 1A:
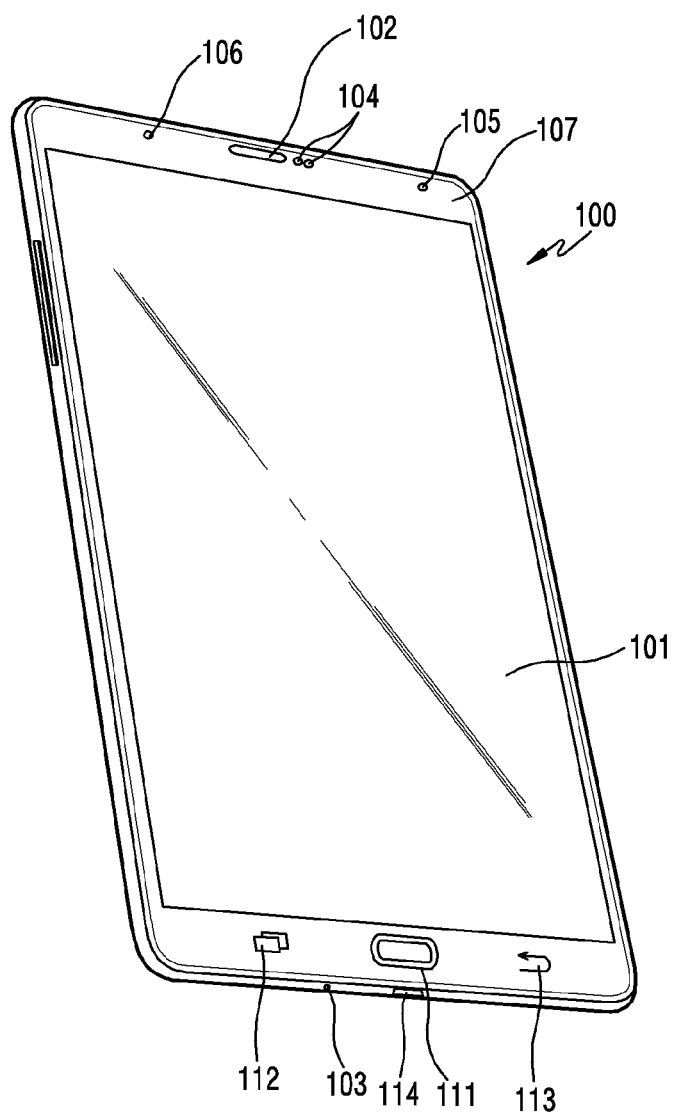
FIG. 1A is a perspective view of an electronic device according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

As used herein, the expression "configured to" may be interchangeably used with, for example, "suitable for", "having the ability to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to embodiments of the present disclosure is not limited to the above-described devices. In the present disclosure, the term "user" may indicate a person using an electronic device or a device (e.g., an artificial intelligence electronic device) using an electronic device.

In the following description, a USB connection may include the state in which an external device is connected to a wired link through a USB cable connected to a connector of the electronic device.

FIG. 1A is a perspective view of an electronic device according to various embodiments of the present disclosure.

Referring to FIG. 1A, a display 101 may be installed on a front surface 107 of an electronic device 100.

According to an embodiment, a speaker device 102 for receiving a voice of a counterpart may be disposed above the display 101. A microphone device 103 for transmitting the voice of a user of the electronic device to the counterpart and a connector 114 for connection of a wired cable (for example, a USB cable) may be disposed below the display 101.

According to an embodiment, at least one sensor 104 may be located near the area in which the speaker device 102 is installed. For example, the sensors 104 may include at least one of an illumination sensor (for example, an optical sensor), a proximity sensor, an infrared sensor, and an ultrasound sensor.

According to an embodiment, a camera device 105 may be located near the area in which the speaker device 102 is installed. Additionally, an indicator 106 for making the user recognize status information of the electronic device 100 may be located near the area in which the speaker device 102 is installed.

According to an embodiment, buttons 111, 112, and 113 for detecting user inputs may be located below the display 101. For example, the first button 111 may be configured as a hardware button, and the second button 112 and the third button 113 may be configured as touch pads. For example, the buttons 111, 112, and 113 for detecting the user input may be configured as part of a touch pad or a touch screen.

Figure 1B:
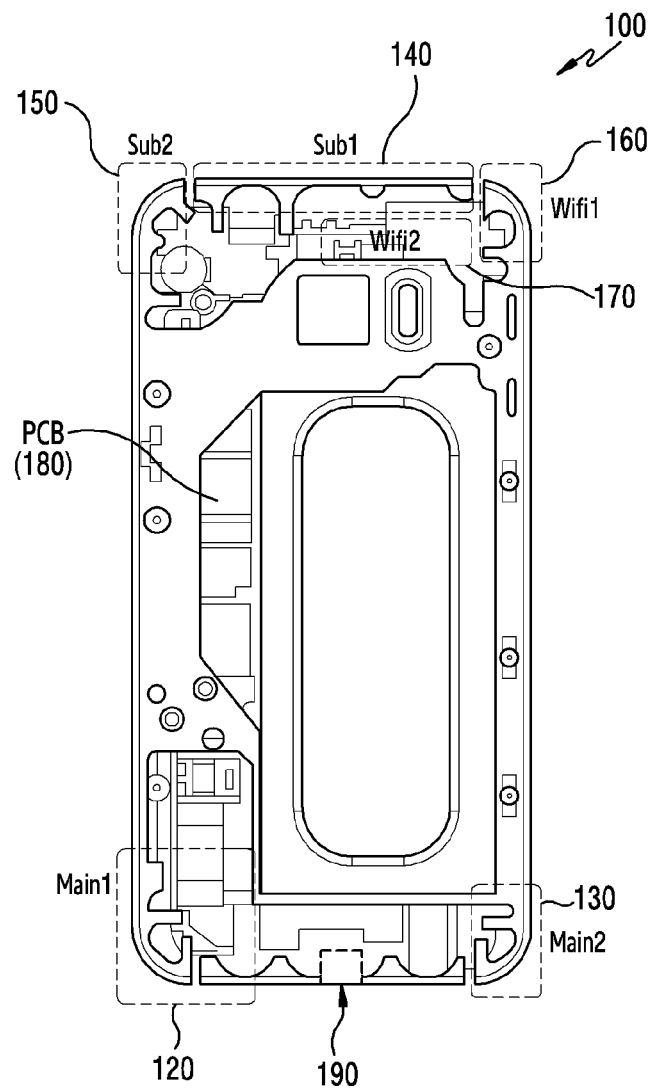
FIG. 1B illustrates the arrangement of antennas of an electronic device according to various embodiments of the present disclosure.

FIG. 1B illustrates the arrangement of antennas of the electronic device according to various embodiments of the present disclosure.

Referring to FIG. 1B, the electronic device 100 may include a plurality of antennas 120 to 170. For example, the plurality of antennas 120 to 170 may be disposed on the upper side or the lower side of a Printed Circuit Board (PCB) 180 of the electronic device 100.

According to an embodiment, the first antenna 120 and the second antenna 130 may include a main antenna for transmitting and receiving a signal for a voice service or a data service. For example, the first antenna 120 and the second antenna 130 may be disposed in a first area of the electronic device 100 (for example, the lower area of the electronic device 100). For example, the first antenna 120 may transmit and receive a signal in a middle-frequency band (for example, 1700 to 2100 MHz) or a signal in a low-frequency band (for example, 700 to 900 MHz). The second antenna 130 may transmit and receive a signal in a high-frequency band (for example, 2300 to 2700 MHz) or a signal in a middle-frequency band. For example, the first antenna 120 and the second antenna 130 may be physically or logically separate from each other. For example, the main antenna may include a reference antenna set to transmit and receive a signal in a corresponding frequency band.

According to an embodiment, each of the third antenna 140 and the fourth antenna 150 may include a sub antenna for receiving a signal for a voice service or a data service. For example, the third antenna 140 and the fourth antenna 150 may be disposed in a second area of the electronic device 100 (for example, an upper area of the electronic device 100). For example, the third antenna 140 may receive a signal in a middle-frequency band or a low-frequency band. The fourth antenna 150 may receive a signal in a high-frequency band or a middle-frequency band. Additionally, the fourth antenna 150 may receive a satellite signal. For example, the third antenna 140 and the fourth antenna 150 may be physically or logically separate from each other. For example, the sub antenna may include a reference antenna set to receive a signal in a corresponding frequency band.

According to an embodiment, the fifth antenna 160 and the sixth antenna 170 may transmit and receive a signal for WLAN (for example, Wi-Fi). For example, the fifth antenna 160 and the sixth antenna 170 may be disposed in the second area of the electronic device 100 (for example, an upper area of the electronic device 100).

According to an embodiment, the connector 190 may be disposed in the first area of the electronic device 100 (for example, the lower area of the electronic device 100). For example, the connector 190 may support USB 3.0 or USB 3.1. The connector 190 may connect the external device to the electronic device 100 through USB via access through a USB cable.

According to various embodiments of the present disclosure, in the electronic device 100, the third antenna 140 and the fourth antenna 150 may be placed in the first area and the first antenna 120 and the second antenna 130 may be placed in the second area.

According to various embodiments of the present disclosure, in the electronic device 100, the first antenna 120 and the second antenna 130 may be placed in a first side of the electronic device 100, and the third antenna 140 and the fourth antenna 150 may be placed in a second side.

Figure 2:
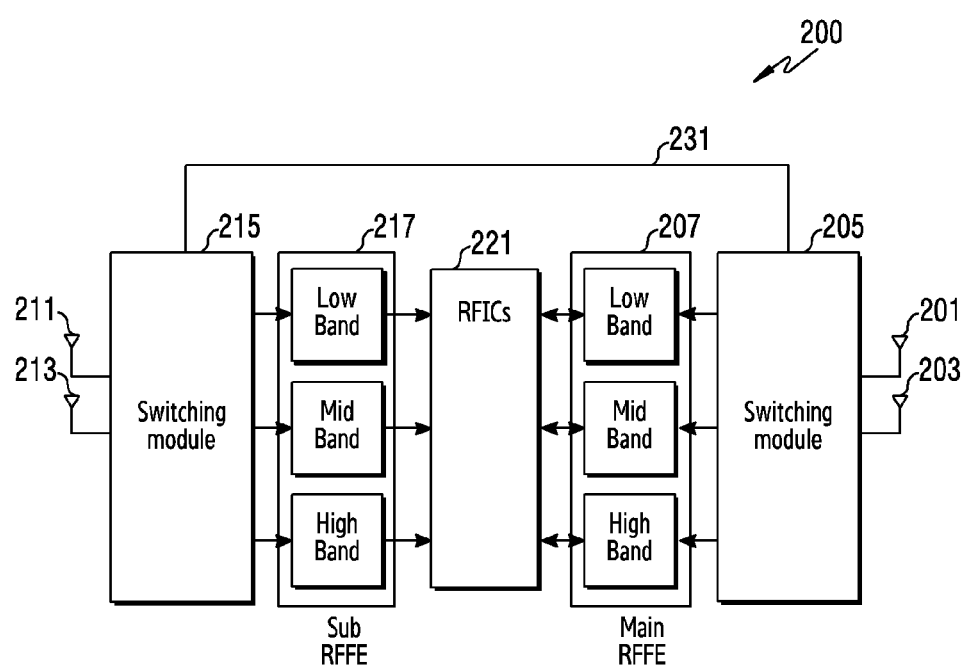
FIG. 2 is a block diagram illustrating an antenna connection in the electronic device according to various embodiments of the present disclosure.

FIG. 2 is a block diagram illustrating an antenna connection in an electronic device according to various embodiments of the present disclosure. Hereinafter, an electronic device 200 may include all or some of the electronic device 100 of FIGS. 1A and 1B. For example, the first antenna 201 and the second antenna 203 may include the first antenna 120 and the second antenna 130 of FIG. 1B. The third antenna 211 and the fourth antenna 213 may include the third antenna 140 and the fourth antenna 150 of FIG. 1B.

Referring to FIG. 2, the electronic device 200 may include a plurality of antennas 201, 203, 211, and 213, a plurality of switching modules 205 and 215, a plurality of Radio-Frequency Front End (RFFE) modules 207 and 217, and an RF Integrated Circuit (RFIC) module 221.

According to an embodiment, the first antenna 201 and the second antenna 203 may be disposed in the first area of the electronic device 200 (for example, the lower area of the electronic device 100) and the third antenna 211 and the fourth antenna 213 may be disposed in the second area (for example, the upper area of the electronic device 100). For example, the first antenna 201 and the second antenna 203 may be set as main antennas for transmitting and receiving signals in a corresponding frequency band. The third antenna 211 and the fourth antenna 213 may be set as sub antennas for receiving signals in a corresponding frequency band. For example, the first antenna 201 and the second antenna 203, disposed in the first area, may include an antenna impedance tuner for impedance tuning.

According to an embodiment, the switching modules 205 and 215 may connect the plurality of antennas 201, 203, 211, and 213 to communication circuits (for example, the RFFE modules 207 and 217, and the RFIC module 221) of the electronic device 200. For example, each switching module 205 or 215 may include a switch and a diplexer.

According to an embodiment, the switch included in each switching module 205 or 215 may connect the plurality of antennas 201, 203, 211, and 213 to the communication circuits (for example, the diplexer and the RFFE modules 207 and 217) of the electronic device 200 through a connection path 231. For example, the switch may be configured as a Double-Pole Double-Throw (DPDT) type. In this case, the switch may determine a transmission antenna by switching operation types of the antenna disposed in the first area and the antenna disposed in the second area through up-and-down antenna switching. For example, the switch may be an x-Pole y-Throw (xPyT) type, and may include a number of poles and throws one more than the number of antennas disposed in the corresponding area (for example, the first area or the second area) for connection to a switch of another switching module. In this case, the switch may determine a transmission antenna among the plurality of antennas 201, 203, 211, and 213 through up-and-down antenna switching, left-and-right antenna switching, or diagonal antenna switching. For example, the connection path 231 may include a coaxial cable, a Flexible PCB (FPCB) type, or a Printed Circuit Board (PCB) internal path.

According to an embodiment, the diplexer may be used to transmit or receive signals of a plurality of frequency bands through one antenna. For example, the diplexer may be used to transmit or receive signals of a low-frequency band and a middle-frequency band through one antenna. For example, the diplexer may be used to transmit or receive signals of a middle-frequency band and a high-frequency band through one antenna.

According to an embodiment, the switching modules 205 and 215 may connect the plurality of antennas 201, 203, 211, and 213 to an internal device of the electronic device 200 under the control of the RFIC module 221 or a processor (for example, an AP or a CP) of the electronic device 200.

According to an embodiment, the main RFFE module 207 may process the signal transmitted and received through one of the plurality of antennas 201, 203, 211, and 213 according to each frequency band of the corresponding signal. For example, the main RFFE module 207 may include a Power Amplifier Module (PAM), a switch, or duplexers. For example, in order to transmit a signal to be transmitted through the antenna to another electronic device through a wireless environment, the PAM may amplify the power of the corresponding signal. The switch may connect the duplexer suitable for the frequency band of the signal transmitted and received through the antenna to the PAM.

According to an embodiment, the sub RFFE module 217 may process the signal received through one of the plurality of antennas 201, 203, 211, and 213 according to each frequency band of the corresponding signal. For example, the sub RFFE module 217 may include a Low-Noise Amplifier (LNA), a band-pass filter, or a switch. For example, the LNA may amplify a signal received through the antenna in order to compensate a loss of the intensity of the signal until the received signal reaches the RFIC module 221. The switch may connect the band pass filter suitable for the frequency band of the signal received through the antenna to the LNA.

According to an embodiment, the RFIC module 221 may process signals transmitted and received through the antennas 201, 203, 211, and 213. For example, the RFIC module 221 may convert RF signals received through the antennas 201, 203, 211, and 213 into baseband signals. The RFIC module 221 may convert baseband signals transmitted through the antennas 201, 203, 211, and 213 into RF signals.

According to various embodiments of the present disclosure, when the electronic device includes each of main antennas and sub antennas for processing signals of a high-frequency band, a middle-frequency band, and a low-frequency band, the electronic device may not include the diplexer.

Figure 3:
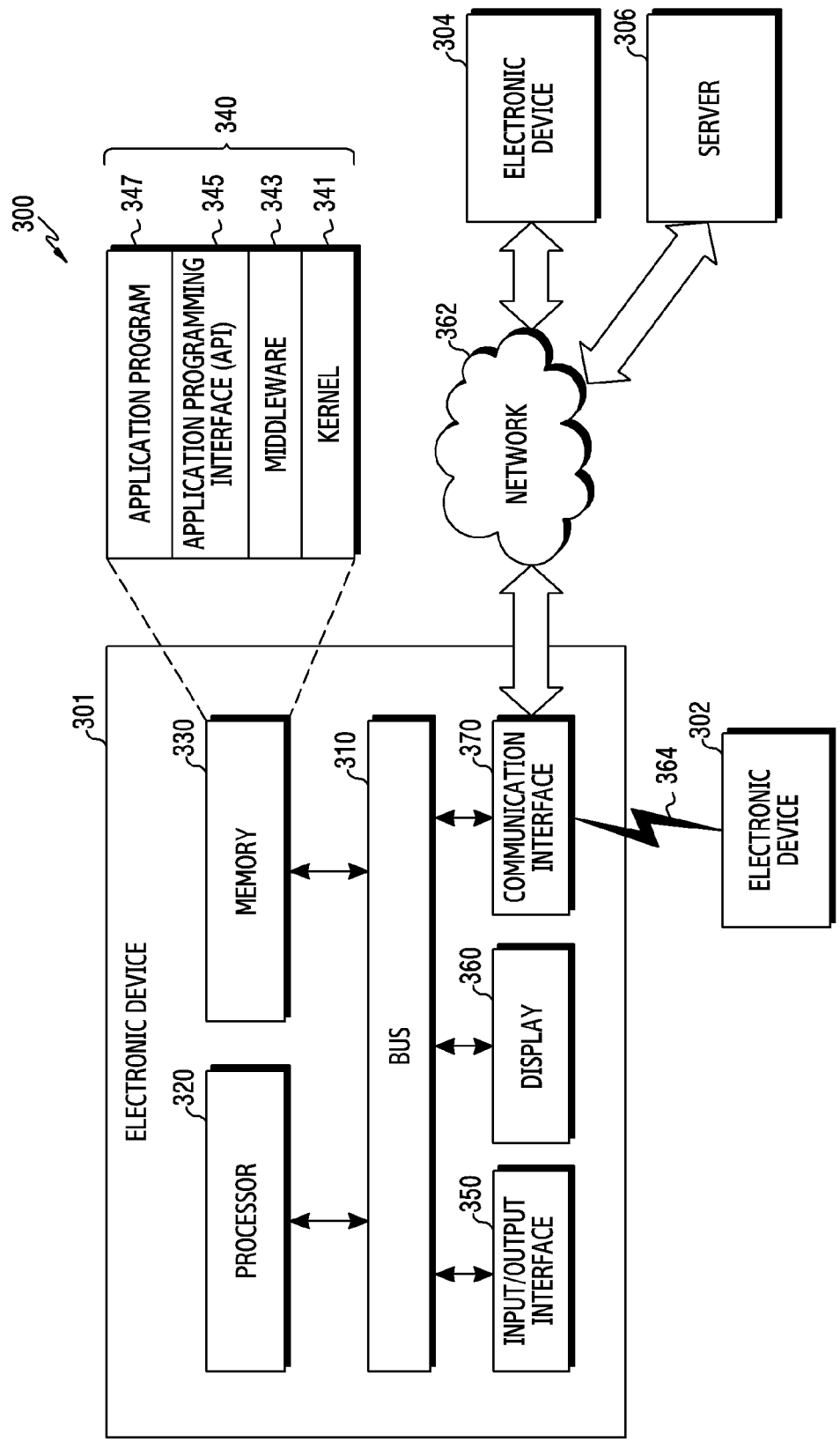
FIG. 3 illustrates an electronic device within a network environment according to various embodiments of the present disclosure.

FIG. 3 is a diagram illustrating a network environment 300 including an electronic device 301 according to various embodiments;

Referring to FIG. 3, the electronic device 301 may include a bus 310, a processor 320, a memory 330, an input/output interface 350, a display 360, and a communication interface 370. According to an example embodiment of the present disclosure, the electronic device 101 may omit at least one of the above components or may further include other components.

The bus 310 may include, for example, a circuit which interconnects the components 320 to 370 and delivers a communication (e.g., a control message and/or data) between the components.

The processor 320 may include, one or more of a Central Processing Unit (CPU), an Application Processor (AP), and a Communication Processor (CP). The processor 320 may carry out, for example, calculation or data processing relating to control and/or communication of at least one other component of the electronic device 301. According to an embodiment, the processor 320 may be implemented in the form of an RFIC module (for example, the RFIC module 221 of FIG. 2).

According to an embodiment, when wireless communication with an external device is established through a communication interface 370, the processor 320 may perform control to transmit and receive a signal through at least one antenna. For example, when the electronic device 301 transmits and receives a signal in a Long-Term Evolution (LTE) communication type, the processor 320 may perform control to perform first-type communication using two predefined antennas among the plurality of antennas in order to acquire a diversity gain or a throughput gain. For example, when the electronic device 301 transmits and receives a signal in a WLAN (for example, Wi-Fi) communication type, the processor 320 may perform control to perform communication using one predefined antenna.

According to an embodiment, the processor 320 may identify whether a connection to an external device is established through the connector of the communication interface 370 in a wired manner. For example, the processor 320 may detect the connection of the wired cable on the basis of a voltage change in at least one pin (for example, identification terminal) for determining the connection of the wired cable (for example, a USB cable) among the pins of the connector.

According to an embodiment, when the wired cable (for example, USB cable) is connected through the communication interface 370, the processor 320 may perform control to provide communication using multiple antennas corresponding to the wired connection (for example, USB connection). For example, when the USB cable of the external device is connected through the connector of the communication interface 370 during wireless communication, the processor 320 may activate a plurality of antennas (for example, four antennas). For example, the processor 320 may activate not only at least one antenna activated for wireless communication but also at least one remaining antenna which was not used for wireless communication. The processor 320 may perform control to provide second-type communication using the plurality of activated antennas (for example, four antennas). For example, the processor 320 may perform control to provide third-type communication using antennas (for example, two antennas) having relatively higher reception performance among the plurality of activated antennas on the basis of the USB connection.

According to an embodiment, the processor 320 may determine a communication type using multiple antennas according to the wired connection (for example, USB connection) on the basis of at least one of the remaining charge of a battery and the quality of service required by the electronic device 301. For example, when it is determined to provide communication using multiple antennas on the basis of the USB connection with the external device, the processor 320 may identify the remaining charge of the battery of the electronic device 301. When the remaining charge of the battery of the electronic device 301 is larger than the reference remaining charge, the processor 320 may perform control to provide the second-type communication using the plurality of antennas (for example, four antennas). When the remaining charge of the battery of the electronic device 301 is smaller than the reference remaining charge, the processor 320 may perform control to provide the third-type communication using the antennas (for example, two antennas) having relatively higher reception performance among the plurality of antennas. For example, the reference remaining charge may be set by user input or based on the service type provided by the electronic device 301. For example, when it is determined to provide communication using multiple antennas on the basis of the USB connection with the external device, the processor 320 may identify the quality of the third-type communication using the antennas (for example, two antennas) having relatively higher reception performance among the plurality of antennas. When the quality of the third-type communication using multiple antennas meets the quality of service required by the electronic device 301, the processor 320 may perform control to provide the third-type communication using multiple antennas. When the quality of the third-type communication using multiple antennas does not meet the quality of service required by the electronic device 301, the processor 320 may perform control to provide the second-type communication using multiple antennas. For example, the quality of service required by the electronic device 301 may include quality of service required by an application that is being executed in the electronic device 301.

According to an embodiment, when the USB connection is established with the external device through the communication interface 370, the processor 320 may determine the communication type using multiple antennas corresponding to the USB connection on the basis of at least one of whether communication using multiple antennas for a serving frequency band is supported and USB power management state information. For example, when the connection with the external device is established via USB, the communication using multiple antennas is supported in the serving frequency band of the electronic device 301, and data transmission/reception to/from the external device is performed using the USB cable, the processor 320 may perform control to provide communication using multiple antennas corresponding to the USB connection. For example, when the USB cable of the external device is not connected through the connector of the communication interface 370, when communication using multiple antennas is not supported in the serving frequency band of the electronic device 301, or when data transmission/reception to/from the external device is not performed using the USB cable, the processor 320 may perform control to maintain the wireless communication type of the electronic device 301. For example, the processor 320 may perform control to maintain the active state of at least one antenna used for performing wireless communication.

According to an embodiment, when the wired connection (for example, USB connection) with the external device is established, the processor 320 may perform control to update a reference value for switching the communication type using multiple antennas. For example, when the USB cable of the external device is connected through the connector of the communication interface 370, the processor 320 may increase the reference value for switching the communication type using multiple antennas so as to be higher than that before the connection of the USB cable. Accordingly, the processor 320 may perform control to switch the communication type using multiple antennas before deterioration of wireless communication performance due to the USB connection occurs, thereby reducing the deterioration of the wireless communication performance due to the USB connection. For example, when the wireless communication performance of the electronic device 301 is lower than a reference value, the processor 320 may control at least one antenna to provide communication using multiple antennas corresponding to the USB connection. For example, when the wireless communication performance of the electronic device 301 is higher than or equal to the reference value, the processor 320 may perform control to maintain the wireless communication type of the electronic device 301. For example, the reference value may include a Signal-to-Noise Ratio (SNR) which is a reference for switching to the communication type using multiple antennas. The wireless communication performance of the electronic device 301 may include average SNR information detected through active antennas of the electronic device 301.

According to an embodiment, when the wired connection (for example, USB connection) with the external device is established, the processor 320 may perform control to update the reference value for switching the communication type using multiple antennas on the basis of at least one of whether communication using multiple antennas is supported in a serving frequency band and whether data transmission using the wired cable (for example, the USB cable) is performed. For example, when the external device is connected through the USB cable, communication using multiple antennas is supported in the serving frequency band of the electronic device 301, and data is transmitted/received to/from the external device through the USB cable, the processor 320 may increase the reference value for switching the communication type using multiple antennas so as to be higher than that before the connection of the USB cable. For example, when the external device is not connected through the USB cable, the communication using multiple antennas is not supported in the serving frequency band of the electronic device 301, or data is not transmitted/received to/from the external device through the USB cable, the processor 320 may perform control to maintain the reference value for switching the communication type using multiple antennas.

According to an embodiment, the processor 320 may detect a connection direction of the wired cable (for example, USB cable) connected through the communication interface 370. For example, when USB type 3.0 (for example, a type C connector) is used, the processor 320 may detect the connection direction of the USB cable on the basis of a change in the voltage applied to a pin CC1 and a pin CC2 of the connector. In the connector, pins for transmitting/receiving data to/from the external device may be disposed at different positions depending on the connection direction of the USB cable. Accordingly, the influence of the USB communication on wireless communication may be different depending on the connection direction of the USB cable due to the difference in distance between a pin for transmitting and receiving data and a feeding piece (RF feeding) of the antenna, corresponding to the connection direction of the USB cable. For example, the wireless communication performance may vary depending on the connection direction of the USB cable as shown in [Table 2] below.

TABLE 2

| DUT | Max TIS (dBm) |
|---|---|
| Default_No USB 3.0 | −99.7 |
| CC2_USB 3.0 | −93.3 |
| CC1_USB 3.0 | −95.8 |
| delta | −2.5 |

In [Table 2], when the USB cable is connected to the connector in a first direction (for example, CC 1_USB 3.0), the reception sensitivity may be higher than in the case in which the USB cable is connected to the connector in a second direction (for example, CC 2_USB 3.0).

According to an embodiment, the processor 320 may perform control to provide communication using multiple antennas on the basis of the connection direction of the USB cable for the connector of the communication interface 370. For example, when the USB cable is connected to the connector in the first direction, the processor 320 may perform control to maintain the wireless communication type of the electronic device 301. When the USB cable is connected to the connector in the second direction, the processor 320 may perform control to provide communication using multiple antennas corresponding to the USB connection. Additionally or alternatively, the processor 320 may perform control to provide communication using multiple antennas corresponding to the USB connection in further consideration of at least one of whether communication using multiple antennas is supported in the serving frequency band and whether data transmission using the USB cable is performed.

According to an embodiment, the processor 320 may perform control to update the reference value for switching the communication type using multiple antennas on the basis of the connection direction of the USB cable for the connector of the communication interface 370. For example, when the USB cable of the external device is connected through the connector of the communication interface 370, the processor 320 may set the reference value for switching the communication type using multiple antennas in accordance with the connection direction of the USB cable. For example, the processor 320 may set the reference values such that the reference value in the case in which the USB cable is connected to the connector in the second direction is higher than the reference value in the case in which the USB cable is connected to the connector in the first direction.

The memory 330 may include a volatile memory and/or a non-volatile memory. The memory 330 may store, for example, commands or data relevant to at least one other component of the electronic device 301. According to an embodiment of the present disclosure, the memory 330 may store software and/or a program 340. The program 340 may include, for example, a kernel 341, middleware 343, an Application Programming Interface (API) 345, and/or application programs (or "applications") 347. At least some of the kernel 341, the middleware 343, and the API 345 may be referred to as an Operating System (OS).

The kernel 341 may control or manage system resources (e.g., the bus 310, the processor 320, or the memory 330) used for performing an operation or function implemented in the other programs (e.g., the middleware 343, the API 345, or the application programs 347). Furthermore, the kernel 341 may provide an interface through which the middleware 343, the API 345, or the application programs 347 may access the individual components of the electronic device 301 to control or manage the system resources.

The middleware 343, for example, may serve as an intermediary for allowing the API 345 or the application programs 347 to communicate with the kernel 341 to exchange data. Also, the middleware 343 may process one or more task requests received from the application programs 347 according to priorities thereof. For example, the middleware 343 may assign priorities for using the system resources (e.g., the bus 310, the processor 320, the memory 330, or the like) of the electronic device 301, to at least one of the application programs 347 and process one or more task requests. The API 345 is an interface through which the applications 347 control functions provided from the kernel 341 or the middleware 343, and may include, for example, at least one interface or function (e.g., instruction) for file control, window control, image processing, character control, and the like.

The input/output interface 350 may function as an interface that may transfer commands or data input from a user or another external device to the other element(s) of the electronic device 301.

Examples of the display 360 may include a Liquid Crystal Display (LCD), a Light-Emitting Diode (LED) display, an Organic Light-Emitting Diode (OLED) display, a Micro-ElectroMechanical Systems (MEMS) display, and an electronic paper display, or the like. The display 360 may display, for example, various types of contents (e.g., text, images, videos, icons, or symbols) to users. The display 360 may include a touch screen, and may receive, for example, a touch, gesture, proximity, or hovering input using an electronic pen or a user's body part.

The communication interface 370 may include various communication circuitry and may establish communication, for example, between the electronic device 301 and an external device (e.g., a first external electronic device 302, a second external electronic device 304, or a server 306). For example, the communication interface 370 may be connected to a network 362 through wireless or wired communication, and may communicate with an external device (e.g., the second external electronic device 304 or the server 306).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. According to one embodiment, the wireless communication may include, for example, at least one of WiFi (wireless fidelity), LiFi (light fidelity), Bluetooth, Bluetooth LE (Low Electric power), Zigbee, Near Field Communication (NFC), Magnetic Secure Transmission, Radio Frequency (RF), Body Area Network (BAN). According to one embodiment, the wireless communication may include Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 362 may include at least one of a telecommunication network such as a computer network (e.g., a LAN or a WAN), the Internet, and a telephone network.

Each of the first and second external electronic devices 302 and 304 may be of a type identical to or different from that of the electronic device 301. According to various example embodiments of the present disclosure, all or some of the operations performed in the electronic device 301 may be executed in another electronic device or a plurality of electronic devices (e.g., the electronic devices 302 and 304 or the server 306). According to an embodiment of the present disclosure, when the electronic device 301 has to perform some functions or services automatically or in response to a request, the electronic device 301 may request another device (e.g., the electronic device 302 or 304 or the server 306) to execute at least some functions relating thereto instead of or in addition to autonomously performing the functions or services. Another electronic device (e.g., the electronic device 302 or 304, or the server 306) may execute the requested functions or the additional functions, and may deliver a result of the execution to the electronic device 301. The electronic device 301 may process the received result as it is or additionally, and may provide the requested functions or services. To this end, for example, cloud computing, distributed computing, or client-server computing technologies may be used.

According to an embodiment, the communication interface 370 may control the connection of antennas under the control of the processor 320. For example, the communication interface 370 may include antennas 201 and 203 arranged in a first area (for example, a lower area) of the electronic device 301, antennas 211 and 213 arranged in a second area (for example, an upper area), and switching modules 205 and 215 for switching antennas as illustrated in FIG. 2. The communication interface 370 may set the connection between the antennas 201, 203, 211, and 213, and internal elements (for example, the diplexer and the RFFE modules 207 and 217) of the electronic device 301 through the first switching module 205, the second switching module 215, and a connection path 231.

According to an embodiment, the communication interface 370 may include the connector for a wired connection (for example, a USB connection).

Figure 4:
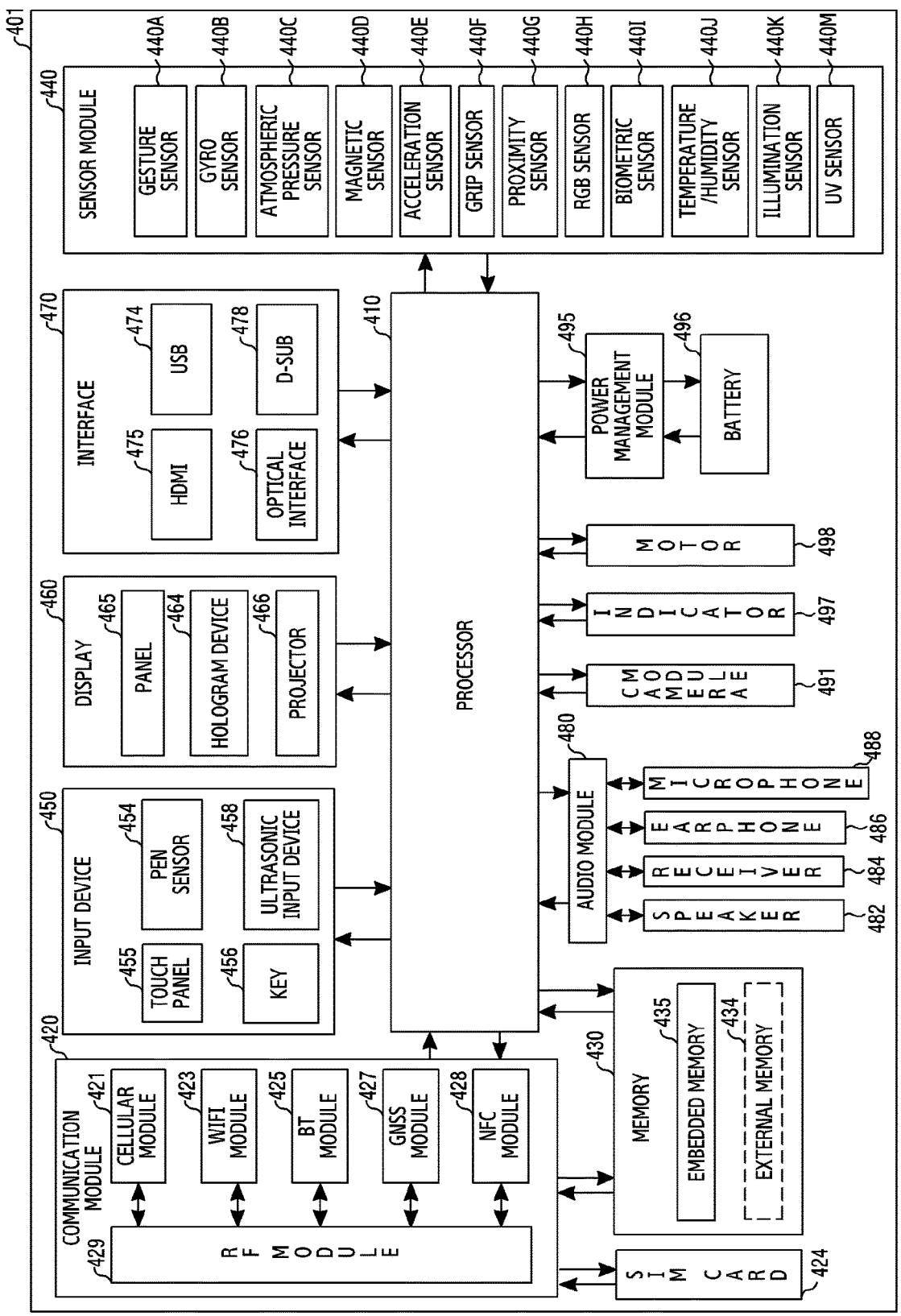
FIG. 4 is a block diagram of an electronic device according to various embodiments of the present disclosure.

FIG. 4 is a block diagram of an electronic device 401 according to various embodiments. The electronic device 401 may include, for example, the entirety or part of the electronic device 301 illustrated in FIG. 3.

Referring to FIG. 4, the electronic device 401 may include one or more processors (e.g., including processing circuitry) 410 (e.g., Application Processors (AP)), a communication module (e.g., including communication circuitry) 420, a Subscriber Identification Module (SIM) 424, a memory 430, a sensor module 440, an input device (e.g., including input circuitry) 450, a display 460, an interface (e.g., including interface circuitry) 470, an audio module 480, a camera module (e.g., including a camera) 491, a power management module 495, a battery 496, an indicator 497, and a motor 498.

The processor 410 may include various processing circuitry configured to control a plurality of hardware or software components connected to the processor 410 by driving an operating system or an application program, and perform processing of various pieces of data and calculations. The processor 410 may be embodied as, for example, a System on Chip (SoC). According to an embodiment of the present disclosure, the processor 410 may further include a Graphic Processing Unit (GPU) and/or an image signal processor. The processor 410 may include at least some (for example, a cellular module 421) of the components illustrated in FIG. 4. The processor 410 may load, into a volatile memory, commands or data received from at least one (e.g., a non-volatile memory) of the other components and may process the loaded commands or data, and may store various data in a non-volatile memory.

According to an embodiment, when the electronic device 401 is connected to an external device via USB, the processor 410 may control antennas of the electronic device 401 to provide wireless communication through the communication type corresponding to the USB connection.

The communication module 420 may have a configuration equal or similar to that of the communication interface 370 of FIG. 3. The communication module 420 may include various communication circuitry, such as, for example, and without limitation, a cellular module 421, a Wi-Fi module 423, a BT module 425, a GNSS module 427, an NFC module 428, and a Radio Frequency (RF) module 429.

The cellular module 421, for example, may provide a voice call, a video call, a text message service, or an Internet service through a communication network. According to an embodiment of the present disclosure, the cellular module 421 may distinguish and authenticate the electronic device 401 in a communication network using the subscriber identification module 424 (for example, the SIM card). According to an embodiment of the present disclosure, the cellular module 421 may perform at least some of the functions that the processor 410 may provide. According to an embodiment of the present disclosure, the cellular module 421 may include a communication processor (CP).

For example, at least some of the Wi-Fi module 423, the BT module 425, the GNSS module 427, and the NFC module 428 may be included in one Integrated Chip (IC) or IC package.

The RF module 429, for example, may transmit/receive a communication signal (e.g., an RF signal). The RF module 429 may include, for example, a transceiver, a Power Amplifier Module (PAM), a frequency filter, a Low Noise Amplifier (LNA), and an antenna. The subscriber identification module 429 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

According to an embodiment, an RF module 429 may control the connection and use of at least one antenna functionally connected to the electronic device 401. For example, the RF module 429 may select a transmission antenna on the basis of the transmission performance of the electronic device 401 and the characteristics of each antenna. The RF module 429 may control the connection between the transmission antenna and internal elements of the electronic device 401 through up-and-down antenna switching, left-and-right antenna switching, and diagonal antenna switching in order to perform signal transmission/reception using the transmission antenna.

The memory 430 (e.g., the memory 330) may include, for example, an embedded memory 435 and/or an external memory 434. The embedded memory 435 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like). The external memory 434 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 434 may be functionally and/or physically connected to the electronic device 201 through various interfaces.

The sensor module 440, for example, may measure a physical quantity or detect an operation state of the electronic device 401, and may convert the measured or detected information into an electrical signal. The sensor module 440 may include, for example, at least one of a gesture sensor 440A, a gyro sensor 440B, an atmospheric pressure sensor (barometer) 440C, a magnetic sensor 440D, an acceleration sensor 440E, a grip sensor 440F, a proximity sensor 440G, a color sensor 440H (e.g., red, green, and blue (RGB) sensor), a biometric sensor (medical sensor) 440I, a temperature/humidity sensor 440J, an illuminance (e.g., light) sensor 440K, and a Ultra Violet (UV) sensor 440M. Additionally or alternatively, the sensor module 440 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 440 may further include a control circuit for controlling one or more sensors included therein. According to an embodiment of the present disclosure, the electronic device 401 may further include a processor configured to control the sensor module 440, as a part of the processor 410 or separately from the processor 410, and may control the sensor module 440 while the processor 410 is in a sleep state.

The input device 450 may include various input circuitry, such as, for example, and without limitation, a touch panel 455, a (digital) pen sensor 454, a key 456, or an ultrasonic input device 458. The touch panel 455 may use, for example, at least one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 454 may include, for example, a recognition sheet which is a part of the touch panel or is separated from the touch panel. The key 456 may include, for example, a physical button, an optical key or a keypad. The ultrasonic input device 458 may detect, through a microphone (e.g., the microphone 488), ultrasonic waves generated by an input tool, and identify data corresponding to the detected ultrasonic waves.

The display 460 (e.g., the display 360 of FIG. 3) may include a panel 465, a hologram device 464, or a projector 466. The panel 465 may be implemented to be, for example, flexible, transparent, or wearable. The panel 465 may be embodied as a single module with the touch panel 455. The hologram device 464 may show a three dimensional (3D) image in the air by using an interference of light. The projector 466 may project light onto a screen to display an image. The screen may be located, for example, in the interior of or on the exterior of the electronic device 401. The interface 470 may include various interface circuitry, such as, for example, and without limitation, a High-Definition Multimedia Interface (HDMI) 475, a Universal Serial Bus (USB) 474, an optical interface 476, or a D-subminiature (D-sub) 478. The interface 470 may be included in, for example, the communication interface 370 illustrated in FIG. 3. Additionally or alternatively, the interface 470 may include, for example, a Mobile High-definition Link (MHL) interface, a Secure Digital (SD) card/Multi-Media Card (MMC) interface, or an Infrared Data Association (IrDA) standard interface.

The audio module 480, for example, may bilaterally convert a sound and an electrical signal. At least some components of the audio module 480 may be included in, for example, the input/output interface 350 illustrated in FIG. 3. The audio module 480 may process voice information input or output through, for example, a speaker 482, a receiver 484, earphones 486, or the microphone 488.

The camera module 491 is, for example, a device which may photograph a still image and a video, according to an embodiment of the present disclosure, may include one or more image sensors (e.g., a front sensor or a back sensor), a lens, an Image Signal Processor (ISP) or a flash (e.g., LED or xenon lamp).

The power management module 495 may manage, for example, power of the electronic device 401. According to an embodiment of the present disclosure, the power management module 495 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 496, and a voltage, a current, or a temperature while charging. The battery 496 may include, for example, a rechargeable battery and/or a solar battery.

The indicator 497 may display a particular state (e.g., a booting state, a message state, a charging state, or the like) of the electronic device 401 or a part (e.g., the processor 410) of the electronic device 401. The motor 498 may convert an electrical signal into a mechanical vibration, and may generate a vibration, a haptic effect, or the like. Although not illustrated, the electronic device 401 may include a processing device (e.g., a GPU) for supporting a mobile TV may process, for example, media data according to a certain standard such as Digital Multimedia Broadcasting (DMB), Digital Video Broadcasting (DVB), or mediaFLO™. Each of the above-described component elements of hardware according to the present disclosure may be configured with one or more components, and the names of the corresponding component elements may vary based on the type of electronic device. In various embodiments, some of the above-described elements may be omitted from the electronic device, or the electronic device may further include additional elements. Also, some of the hardware components according to various embodiments may be combined into one entity, which may perform functions identical to those of the relevant components before the combination.

According to various embodiments of the present disclosure, an electronic device (for example, the electronic device 301 of FIG. 3) may include a plurality of antennas, a communication circuit connected to the plurality of antennas, a connector, and at least one processor, wherein the processor may perform control to identify whether a wired cable is connected through the connector and perform communication using multiple antennas corresponding to the connection of the wired cable when the wired cable is connected through the connector.

According to various embodiments, when the wired cable is connected through the connector, the processor may perform control to switch from first-type communication using a first number of antennas to second-type communication using a second number of antennas, among the plurality of antennas, and the second number of antennas may include a larger number of antennas than the first number of antennas.

According to various embodiments, when the wired cable is connected through the connector, the processor may be configured to determine whether to switch a communication type using multiple antennas corresponding to the connection of the wired cable on the basis of at least one of whether data is transmitted through the wired cable and whether communication using multiple antennas is supported in a serving frequency band of the electronic device, and when it is determined to switch the communication type using multiple antennas corresponding to the connection of the wired cable, switch antennas corresponding to the communication type using multiple antennas among the plurality of antennas to an active state.

According to various embodiments, the wired cable may include a Universal Serial Bus (USB) cable.

According to various embodiments, when the wired cable is connected through a connector, the processor may be configured to update a reference value for switching a communication type using multiple antennas, and when it is determined to switch a communication type using multiple antennas corresponding to the connection of the wired cable on the basis of the wireless communication performance of the electronic device and the updated reference value, switch antennas corresponding to the communication type using the multiple antennas among the plurality of antennas to an active state.

According to various embodiments, the processor may be configured to determine whether to update the reference value on the basis of at least one of whether data is transmitted through the wired cable and whether communication using multiple antennas is supported in the serving frequency band of the electronic device, and when it is determined to update the reference value, update the reference value for switching the communication type using multiple antennas on the basis of the connection of the wired cable.

According to various embodiments, the processor may be configured to select a communication type using multiple antennas corresponding to the connection of the wired cable on the basis of at least one of the remaining charge of a battery of the electronic device and the quality of service required by the electronic device.

According to various embodiments, the electronic device may include a plurality of antennas, a communication circuit connected to the plurality of antennas, a connector, and at least one processor, wherein the processor may perform control to identify whether a wired cable is connected through the connector, and when the wired cable is connected through the connector, perform communication using multiple antennas corresponding to the connection of the wired cable on the basis of the connection direction of the wired cable.

According to various embodiments, the wired cable may include a Universal Serial Bus (USB) cable.

According to various embodiments, the processor may be configured to detect the connection direction of the USB cable on the basis of a change in the voltage applied to pins CC1 and CC2 of the connector.

According to various embodiments, when the wired cable is connected in a first direction through the connector, the processor may be configured to switch a communication scheme using multiple antennas corresponding to the connection of the wired cable, and when the wired cable is connected in a second direction through the connector, maintain a communication type using at least one antenna.

According to various embodiments, the processor may be configured to differently update a reference value for switching a communication type using multiple antennas corresponding to the connection of the wired cable in accordance with the connection direction of the wired cable.

According to various embodiments, the processor may determine whether to update the reference value on the basis of at least one of whether data is transmitted through the wired cable and whether communication using multiple antennas is supported in the serving frequency band of the electronic device, and when it is determined to update the reference value, update the reference value for switching the communication type using multiple antennas on the basis of the connection of the wired cable.

Figure 5:
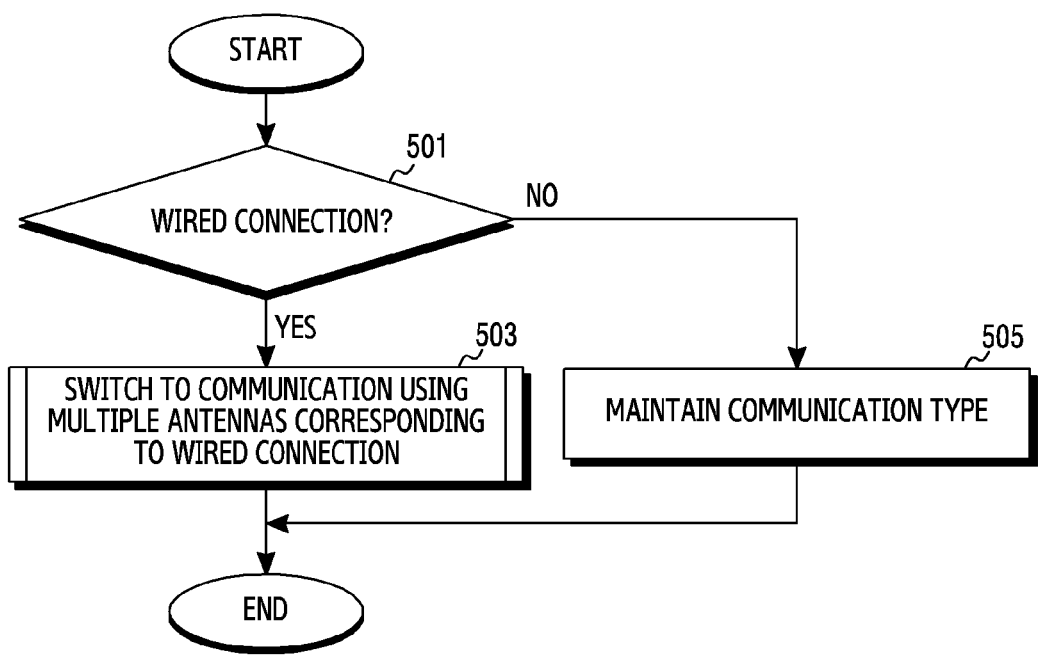
FIG. 5 is a flowchart illustrating a process by which an electronic device provides communication using multiple antennas on the basis of a wired connection (for example, a USB connection) according to various embodiments of the present disclosure.

FIG. 5 is a flowchart illustrating a process in which the electronic device provides communication using multiple antennas on the basis of a wired connection (for example, a USB connection) according to various embodiments of the present disclosure. Hereinafter, the electronic device may include the entirety or part (for example, the processor 320) of the electronic device 301 of FIG. 3.

Referring to FIG. 5, the electronic device may identify whether the electronic device is connected to the external device through a wire (for example, a USB) in operation 501. For example, the processor 320 may detect the USB connection to the external device on the basis of an RC delay detected through the connector of the communication interface 370.

When the electronic device is connected to the external device through the wire (for example, the USB), the electronic device may switch a wireless communication type of the electronic device in accordance with the wired connection (for example, the UBS connection) in operation 503. For example, when the USB connection to the external device is detected during wireless communication, the processor 320 may activate four antennas electrically connected to the electronic device 301. The processor 320 may provide second-type communication using the activated four antennas. For example, when the USB connection to the external device is detected during wireless communication, the processor 320 may select two antennas having relatively good reception performance among a plurality of antennas on the basis of the USB connection. The processor 320 may perform control to provide third-type communication using the two antennas having the relatively good reception performance. Additionally or alternatively, the processor 320 may perform control to provide communication using multiple antennas corresponding to the USB connection in further consideration of at least one of whether communication using multiple antennas is supported in a serving frequency band and USB power management state information.

When the electronic device is not connected to the external device through the wire (for example, the USB), the electronic device may maintain the wireless communication type of the electronic device in operation 505. For example, the processor 320 may maintain the active state of at least one antenna used for wireless communication.

Figure 6:
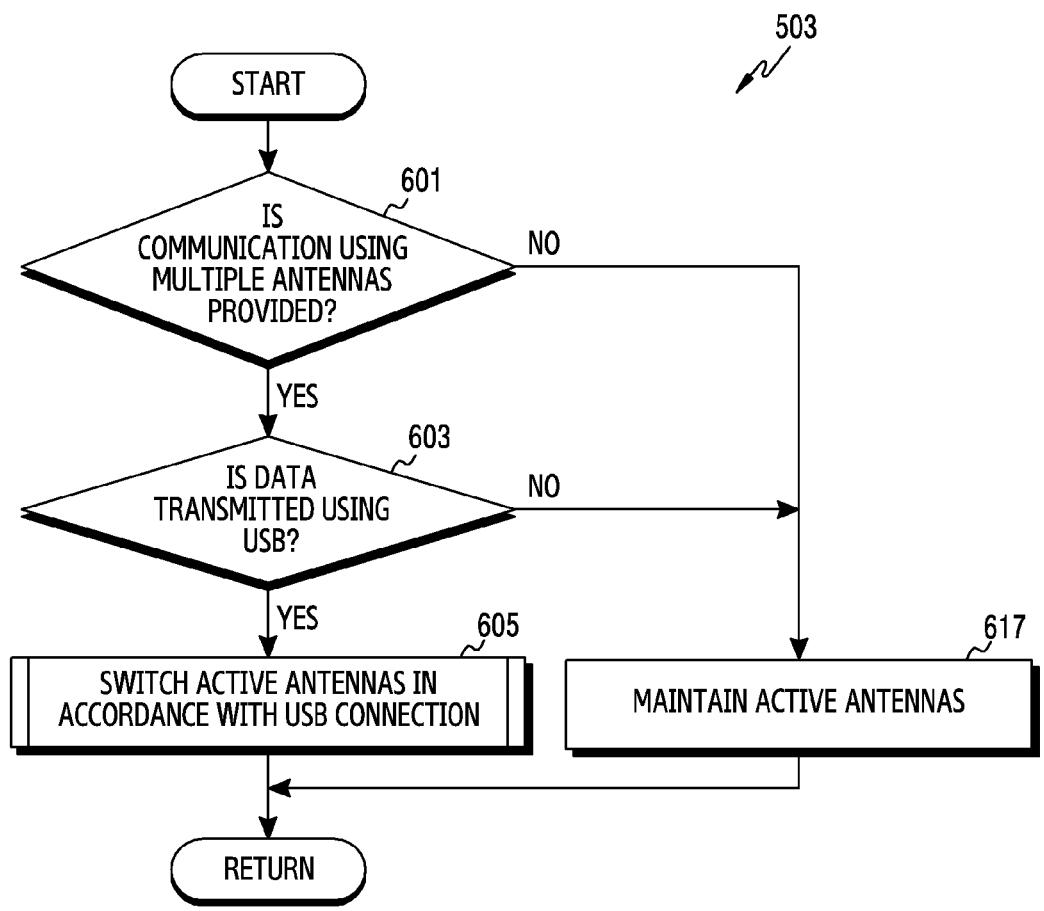
FIG. 6 is a flowchart illustrating a process in which an electronic device controls antennas on the basis of data transmission using a USB according to various embodiments of the present disclosure.

FIG. 6 is a flowchart illustrating a process in which the electronic device controls antennas on the basis of data transmission via USB according to various embodiments of the present disclosure. Hereinafter, the operation for providing communication using multiple antennas corresponding to the USB connection in operation 503 of FIG. 5 will be described. Hereinafter, the electronic device may include the entirety or part (for example, the processor 320) of the electronic device 301 of FIG. 3.

Referring to FIG. 6, when the electronic device is connected to the external device via USB (for example, operation 501 of FIG. 5), it may be identified whether the electronic device is capable of providing communication using multiple antennas in operation 601. For example, the processor 320 may identify whether communication using multiple antennas is supported in the serving frequency band in which the electronic device 301 performs wireless communication.

When the electronic device supports communication using multiple antennas, the electronic device may identify whether data is transmitted/received to/from the external device through the USB connection in operation 603. For example, the USB connection may have power management states classified as shown in [Table 3] below.

TABLE 3

| Link state | Description | Key characteristic | Exit Latency |
|---|---|---|---|
| U0 | Link active | | N/A |
| U1 | Link idle, fast exit | Rx and Tx circuitry quiesced | μs range |
| U2 | Link idle, slow exit | Clock generation circuitry may alos be quiesced | Typically low ms range can be range |
| U3 | Suspend | Portions of device power may be removed, e.g. much of PHY | 4.7 KΩ ± 5% |

In [Table 3], the USB connection have power management states classified into a state U0, in which the electronic device transmits/receives data to/from the external device through a USB link, a state U1, in which data transmission/reception using the USB link is stopped, a state U2, in which the operation of a clock generation circuit is stopped, and a state U3, in which there is no power in the external device. When the USB connection to the external device is in the state U0, the processor 320 may determine that data is transmitted/received to/from the external device through the USB connection. For example, the processor 320 may estimate the power management state of the USB connection on the basis of whether the data is transmitted/received to/from the external device through the USB link.

When the data is transmitted/received to/from the external device through the USB connection in operation 605, the electronic device may switch a plurality of antennas to active antennas in order to perform communication using multiple antennas corresponding to the USB connection. For example, when communication using multiple antennas is supported in the serving frequency of the electronic device 301 and data is transmitted/received to/from the external device through the USB connection, the processor 320 may select the communication type using multiple antennas corresponding to the USB connection. For example, the processor 320 may determine the communication type using multiple antennas corresponding to the USB connection on the basis of at least one of the remaining charge of the battery of the electronic device 301 and information on the quality of service required by the electronic device 301. The processor 320 may switch a plurality of antennas to be used for wireless communication to the active state in accordance with the communication type using multiple antennas corresponding to the USB connection. For example, in an LTE communication type, the processor 320 may switch the plurality of antennas to the active state in order to perform second-type communication using four antennas or third-type communication using two antennas having relatively good reception performance.

When communication using multiple antennas is not supported in the serving frequency of the electronic device or data is not transmitted/received to/from the external device through the USB connection, the electronic device may maintain the active state of the antennas used for wireless communication in operation 607. For example, in the LTE communication type, the processor 320 may maintain the active state of two antennas used for performing the first-type communication using two predefined antennas.

Figure 7:
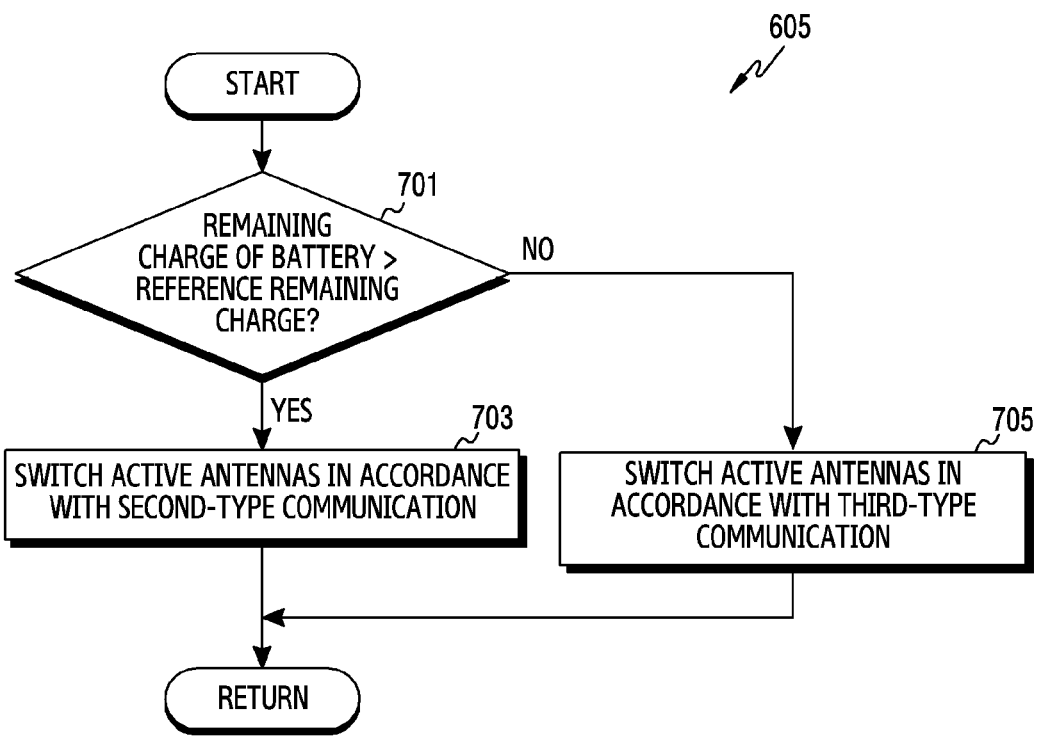
FIG. 7 is a flowchart illustrating a process in which an electronic device determines a communication type using multiple antennas on the basis of the remaining charge of a battery.

FIG. 7 is a flowchart illustrating the process in which the electronic device determines a communication type using multiple antennas on the basis of the remaining charge of the battery according to various embodiments of the present disclosure. Hereinafter, the operation for providing communication using multiple antennas corresponding to the USB connection in operation 605 of FIG. 6 will be described. Hereinafter, the electronic device may include the entirety or part (for example, the processor 320) of the electronic device 301 of FIG. 3.

Referring to FIG. 7, when communication using multiple antennas is supported in the serving frequency of the electronic device 301 and data is transmitted/received to/from the external device through the USB connection (operation 603 of FIG. 6), the electronic device may identify whether the remaining charge of the battery of the electronic device is larger than the reference remaining charge in operation 701. For example, the reference remaining charge may be predefined in the electronic device 301, or may be set on the basis of user input or the type of service provided by the electronic device 301.

When the remaining charge of the battery of the electronic device is larger than the reference remaining charge in operation 703, the electronic device may switch active antennas in accordance with the second-type communication using multiple antennas. For example, when the remaining charge of the battery of the electronic device 301 is larger than the reference remaining charge, the processor 320 may determine that second-type communication using multiple antennas is supported. Accordingly, the processor 320 may activate a plurality of antennas (for example, four antennas) electrically connected to the electronic device 301. The processor 320 may control the communication interface 370 to provide the second-type communication using the plurality of activated antennas.

When the remaining charge of the battery of the electronic device is equal to or smaller than the reference remaining charge, the electronic device may switch the active antennas in accordance with the third-type communication using multiple antennas in operation 705. For example, when the remaining charge of the battery of the electronic device 301 is equal to or smaller than the reference remaining charge, the processor 320 may determine that the use of the second-type communication using multiple antennas is limited by the remaining charge of the battery of the electronic device 301. Accordingly, the processor 320 may select two antennas having a relatively good reception state among the plurality of antennas (for example, four antennas) electrically connected to the electronic device 301. The processor 320 may control the communication interface 370 to provide the third-type communication for receiving signals through two antennas having a relatively good reception state. For example, the processor 320 may identify the reception state of each antenna stored in the memory 330, or may identify the reception state of each antenna by sequentially or temporarily activating the plurality of antennas.

Figure 8:
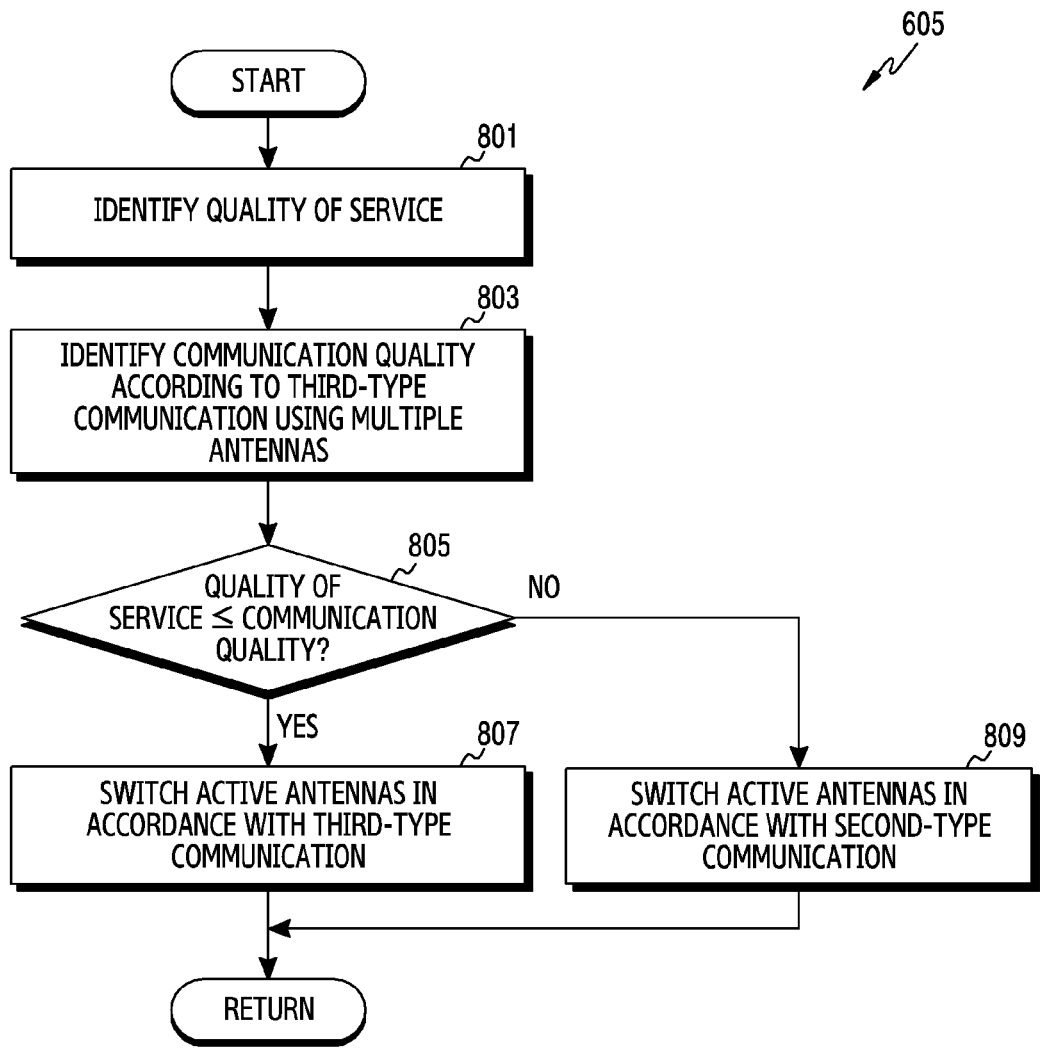
FIG. 8 is a flowchart illustrating a process in which an electronic device determines a communication type using multiple antennas on the basis of quality of service of an application according to various embodiments of the present disclosure.

FIG. 8 is a flowchart illustrating a process in which the electronic device determines a communication type using multiple antennas on the basis of quality of service of an application according to various embodiments of the present disclosure. Hereinafter, the operation for providing communication using multiple antennas corresponding to the USB connection in operation 605 of FIG. 6 will be described. Hereinafter, the electronic device may include the entirety or part (for example, the processor 320) of the electronic device 301 of FIG. 3.

Referring to FIG. 8, when communication using multiple antennas is supported in the serving frequency of the electronic device 301 and data is transmitted/received to/from the external device through the USB connection (operation 603 of FIG. 6), the electronic device may identify the quality of service required by the electronic device in operation 801. For example, the processor 320 may identify the Quality of Service (QoS) required by an application executed by the electronic device 301.

The electronic device may identify the communication quality of the electronic device according to the third-type communication using multiple antennas in operation 803. For example, the processor 320 may activate a plurality of antennas (for example, four antennas) electrically connected to the electronic device 301. The processor 320 may detect the antenna combination having the best wireless communication performance by comparing the wireless communication performance (for example, SNRs) of antenna combinations that can be implemented by a plurality of antennas. The processor 320 may recognize the wireless communication performance of the antenna combination having the best wireless communication performance as the communication quality of the electronic device according to the third-type communication using multiple antennas.

The electronic device may identify whether the communication quality of the electronic device according to the third-type communication using multiple antennas is higher than or equal to the quality of service required by the electronic device in operation 805. For example, the processor 320 may identify whether the communication quality of the electronic device according to the third-type communication using multiple antennas meets the quality of service required by the electronic device. For example, when the communication quality of the electronic device according to the third-type communication using multiple antennas is higher than or equal to the quality of service required by the electronic device, the processor 320 may determine that the communication quality of the electronic device according to the third-type communication using multiple antennas meets the quality of service required by the electronic device.

When the communication quality of the electronic device according to the third-type communication using multiple antennas is higher than or equal to the quality of service required by the electronic device, the electronic device may switch active antennas in accordance with the third-type communication using multiple antennas in operation 807. For example, when the communication quality of the electronic device according to the third-type communication using multiple antennas meets the quality of service required by the electronic device, the processor 320 may provide the third-type communication using two antennas having a relatively good reception state among the plurality of antennas (for example, four antennas) electrically connected to the electronic device 301. For example, the two antennas having the relatively good reception state may include two antennas included in the antenna combinations used for detecting the communication quality of the electronic device according to the third-type communication using multiple antennas in operation 803.

When the communication quality of the electronic device according to the third-type communication using multiple antennas is lower than the quality of service required by the electronic device, the electronic device may switch the active antennas in accordance with the second-type communication using multiple antennas in operation 809. For example, when the communication quality of the electronic device according to the third-type communication using multiple antennas does not meet the quality of service required by the electronic device, the processor 320 may determine that the second-type communication using multiple antennas is provided. Accordingly, the processor 320 may activate a plurality of antennas (for example, four antennas) electrically connected to the electronic device 301 and provide the second-type communication using the plurality of antennas.

Figure 9:
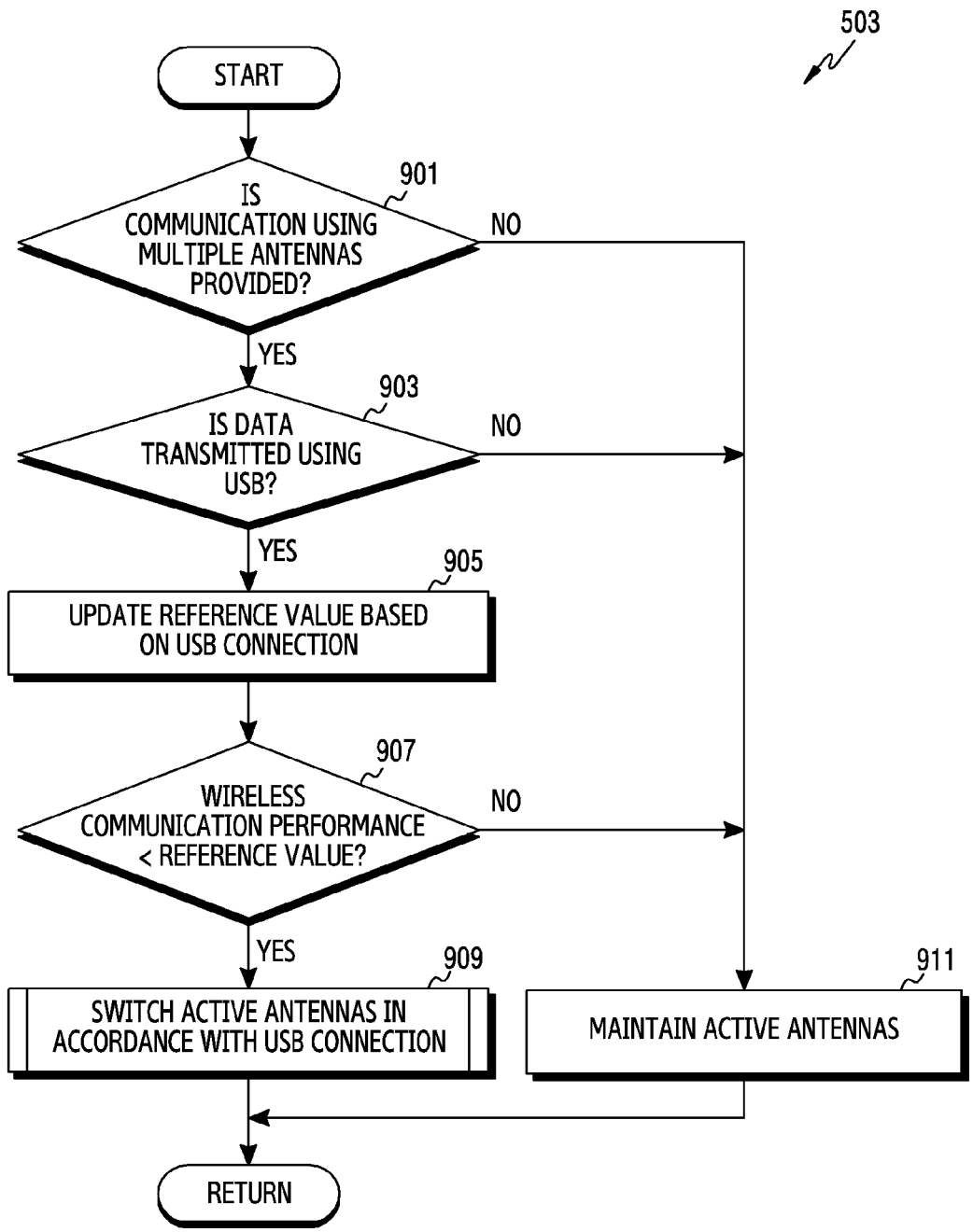
FIG. 9 is a flowchart illustrating a process in which an electronic device updates a reference value for controlling antennas on the basis of data transmission using a USB according to various embodiments of the present disclosure.

FIG. 9 is a flowchart illustrating a process in which the electronic device updates a reference value for controlling antennas on the basis of data transmission using the USB according to various embodiments of the present disclosure. Hereinafter, the operation for providing communication using multiple antennas corresponding to the USB connection in operation 503 of FIG. 5 will be described. Hereinafter, the electronic device may include the entirety or part (for example, the processor 320) of the electronic device 301 of FIG. 3.

Referring to FIG. 9, when the electronic device is connected to the external device via USB (for example, operation 501 of FIG. 5), the electronic device may identify whether communication using multiple antennas is supported in the serving frequency band of the electronic device in operation 901.

When the communication using multiple antennas is supported in the serving frequency band of the electronic device, the electronic device may identify whether data is transmitted/received to/from the external device through the USB connection in operation 903. For example, the processor 320 may identify whether the USB connection with the external device is in the state U0, in which data is transmitted/received to/from the external device through a USB link.

When the data is transmitted/received to/from the external device through the USB connection, the electronic device may update the reference value for switching the communication type using multiple antennas in accordance with the USB connection in operation 905. For example, when communication using multiple antennas is supported in the serving frequency of the electronic device 301 and data is transmitted/received to/from the external device through the USB connection, the processor 320 may determine that wireless communication performance is deteriorated due to the USB communication. Accordingly, the processor 320 may update the reference value for switching the communication type using multiple antennas to be higher than that before the connection of the USB cable in order to switch the communication type to another communication type before the deterioration of the wireless communication performance due to the USB communication. For example, the reference value may include an SNR value which is a reference for switching to the communication type using multiple antennas corresponding to the USB connection.

The electronic device may identify whether the wireless communication performance of the electronic device is smaller than the reference value for switching the communication type using multiple antennas in operation 907. For example, the processor 320 may identify whether the SNR value according to data transmission/reception using at least one antenna is smaller than a reference SNR value for switching the communication type using multiple antennas corresponding to the USB connection.

When the wireless communication performance of the electronic device is lower than the reference value for switching the communication type using multiple antennas, the electronic device may switch the plurality of antennas to be provided for wireless communication to the active state on the basis of communication using multiple antennas corresponding to the USB connection in operation 909. For example, the processor 320 may determine the communication type using multiple antennas corresponding to the USB connection on the basis of at least one of the remaining charge of the battery of the electronic device 301 and the information on quality of service required by the electronic device 301, as in operations 701 to 705 of FIG. 7 or operations 801 to 809 of FIG. 8. The processor 320 may switch, to the active state, the number of antennas corresponding to the communication type (for example, the second-type communication or the third-type communication) using multiple antennas corresponding to the USB connection among the plurality of antennas electrically connected to the electronic device 301. For example, in the Wi-Fi communication type, the processor 320 may switch two Wi-Fi antennas (for example, the fifth antenna 160 and the sixth antenna 170 of FIG. 1B) to the active state for the third-type communication using multiple antennas. For example, in the LTE communication type, the processor 320 may switch two antennas having relatively good reception performance (for example, the third antenna 140 and the fourth antenna 150 of FIG. 1B) to the active state for the third-type communication using multiple antennas. For example, in the LTE communication type, the processor 320 may switch four antennas (for example, the first antenna 120 to the fourth antenna 150) to the active state for the second-type communication using multiple antennas.

When communication using multiple antennas is not supported in the serving frequency of the electronic device, when data is not transmitted/received to/from the external device through the USB connection, or when the wireless communication performance of the electronic device is higher than or equal to the reference value for switching the communication type using multiple antennas, the electronic device may maintain the active state of the antennas used for wireless communication in operation 911. For example, in the Wi-Fi communication type, the processor 320 may maintain the active state of one antenna used for wireless communication. For example, in the LTE communication type, the processor 320 may maintain the active state of two antennas (for example, the first antenna 120 and the third antenna 140 of FIG. 1B) used for wireless communication.

According to an embodiment, switching of the communication type using multiple antennas may include switching of the communication type for providing communication using multiple antennas or switching from the communication type, which uses multiple antennas and is provided by the electronic device, to another communication type using multiple antennas.

Figure 10:
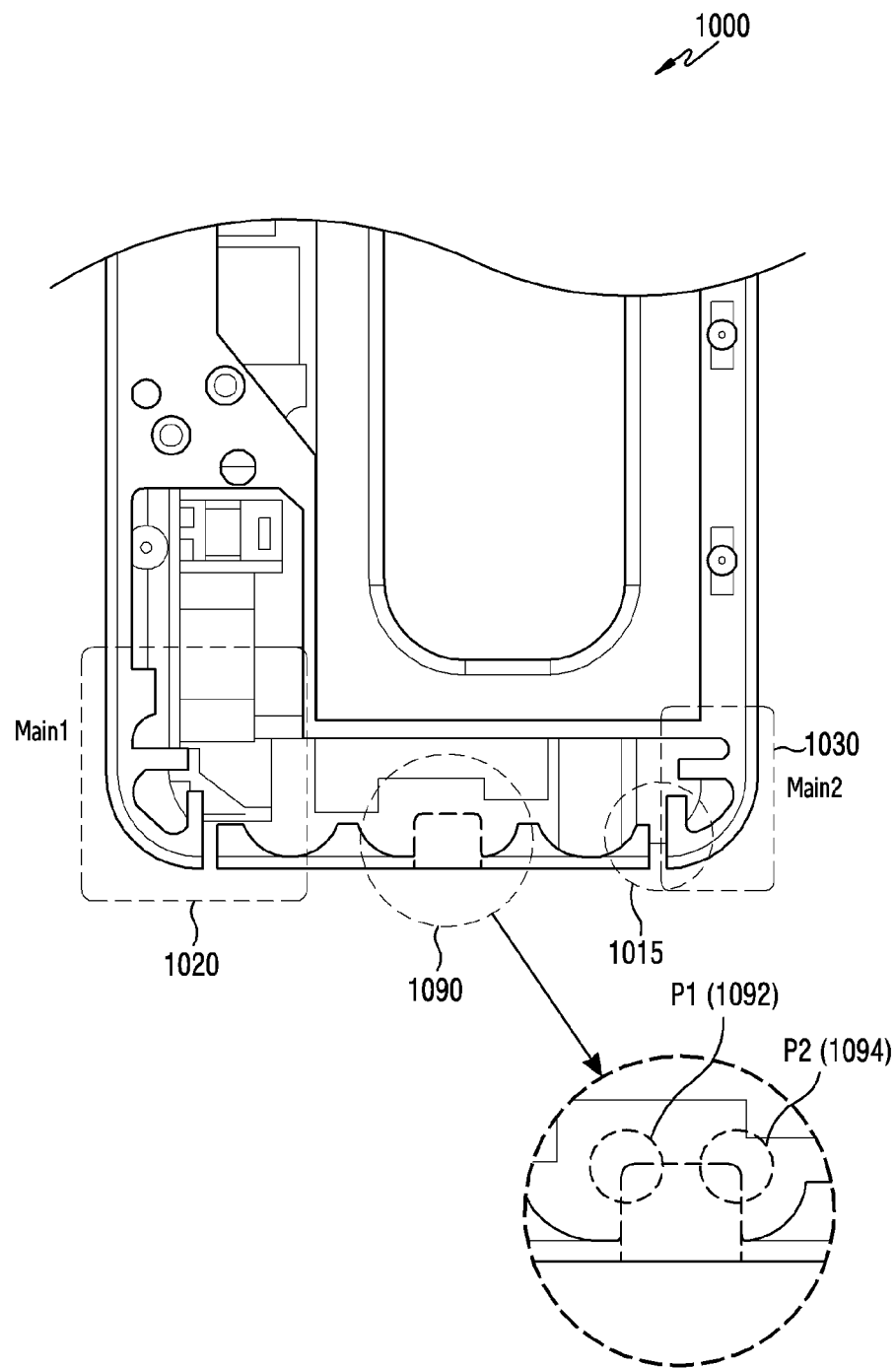
FIG. 10 illustrates the configuration of a USB connector in an electronic device according to various embodiments of the present disclosure.

FIG. 10 illustrates the configuration of the USB connector of the electronic device according to various embodiments of the present disclosure. Hereinafter, an electronic device 1000 may include part of the electronic device 100 of FIG. 1B.

Referring to FIG. 10, the electronic device 1000 may include a first antenna 1020 and a second antenna 1030 arranged in a first area of the electronic device 1000 (for example, a lower area of the electronic device 1000). For example, in the electronic device 1000, a feeding piece 1015 for RF feeding may be arranged to be adjacent to the second antenna 1030.

According to an embodiment, a connector 1090 may be disposed in the first area of the electronic device 1000 (for example, the lower area of the electronic device 1000). For example, in the case of USB 3.0 type C, the connector 1090 may detect a bidirectional connection of the USB cable. The connector 1090 may have a pin P1 1090 or a pin P2 1094 for transmitting/receiving data to/from the external device, which is arranged at a different position depending on the connection direction (CC1 or CC2) of the USB cable. Accordingly, the wireless communication performance (for example, reception sensitivity) of the electronic device may be generated differently depending on the connection direction of the USB cable due to the difference in distance between the pin P1 1090 or the pin P2 1094 for transmitting/receiving data and the feeding piece 1015 of the antenna. For example, P2 1094 in the case in which the USB cable is connected in the second direction (CC2) may be arranged closer to the feeding piece 1015 of the antenna than P1 1092 in the case in which the USB cable is connected in the first direction (CC1). Accordingly, the wireless communication performance in the case in which the USB cable is connected in the second direction (CC2) may be lower than the wireless communication performance in the case in which the USB cable is connected in the first direction (CC1).

Figure 11:
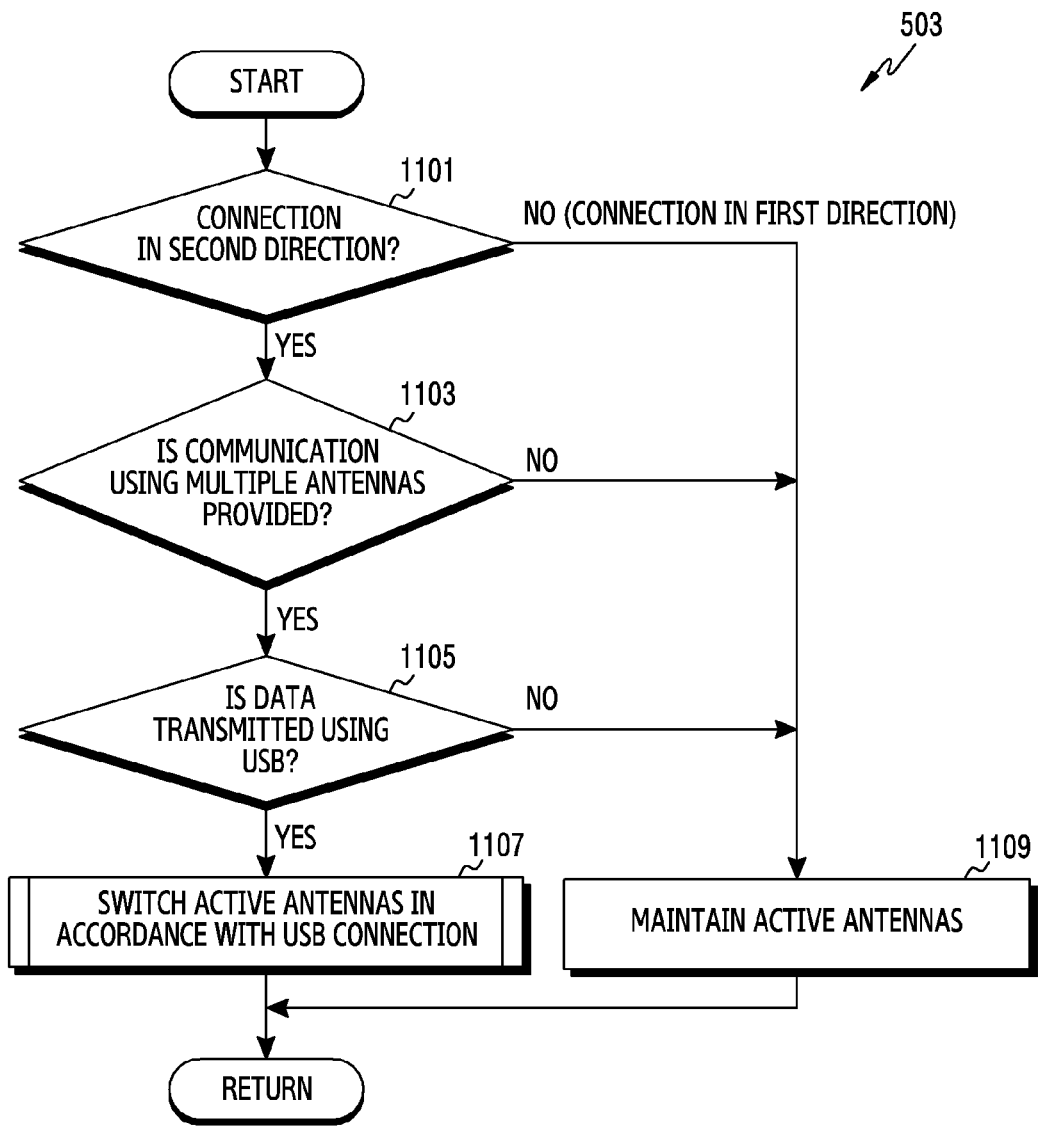
FIG. 11 is a flowchart illustrating a process in which an electronic device controls antennas on the basis of the connection direction of a USB cable according to various embodiments of the present disclosure.

FIG. 11 is a flowchart illustrating a process in which the electronic device controls antennas on the basis of the connection direction of the USB cable according to various embodiments of the present disclosure. Hereinafter, the operation for providing communication using multiple antennas corresponding to the USB connection in operation 503 of FIG. 5 will be described. Hereinafter, the electronic device may include the entirety or part (for example, the processor 320) of the electronic device 301 of FIG. 3.

Referring to FIG. 11, when the electronic device is connected to the external device via USB (for example, operation 501 of FIG. 5), the electronic device may identify whether the USB cable is connected to the connector of the electronic device in the second direction (for example, CC2) in operation 1101. For example, the processor 320 may detect the connection direction of the USB cable on the basis of a change in the voltage applied to the pin CC1 and the pin CC2 of the communication interface 370.

When the USB cable is connected in the second direction, the electronic device may identify whether communication using multiple antennas can be provided in the serving frequency band of the electronic device in operation 1103.

For example, the serving frequency band may include an operation frequency band used by the electronic device 301 for wireless communication.

When the communication using multiple antennas is supported in the serving frequency band of the electronic device, the electronic device may identify whether data is transmitted/received to/from the external device through the USB connection in operation 1105. For example, the processor 320 may switch the power management state of the USB connection through Low-Frequency Periodic Signaling (LFPS). The processor 320 may identify whether the power management state of the USB connection switched through LFPS is the state U0 in which data is transmitted/received to/from the external device through the USB link.

When data is transmitted/received to/from the external device through the USB connection, the electronic device may switch a plurality of antennas to the active state in order to support communication using multiple antennas corresponding to the USB connection in operation 1107. For example, the processor 320 may determine the communication type using multiple antennas corresponding to the USB connection on the basis of at least one of the remaining charge of the battery of the electronic device 301 and the information on quality of service required by the electronic device 301, as in operations 701 to 705 of FIG. 7 or operations 801 to 809 of FIG. 8.

When the USB cable is connected in the first direction, when communication using multiple antennas is not supported in the serving frequency of the electronic device 301, or when data is not transmitted/received to/from the external device through the USB connection, the electronic device may maintain the active state of the antennas used for wireless communication in operation 1109. For example, when the USB cable is connected in the first direction, the processor 320 may determine that there is no interference from USB communication due to the difference in distance between P1 1092 and feeding piece 1015 for RF feeding or that the level of interference from the USB communication can be ignored. Accordingly, the processor 320 may maintain the active state of at least one antenna in order to maintain wireless communication using at least one antenna.

Figure 12:
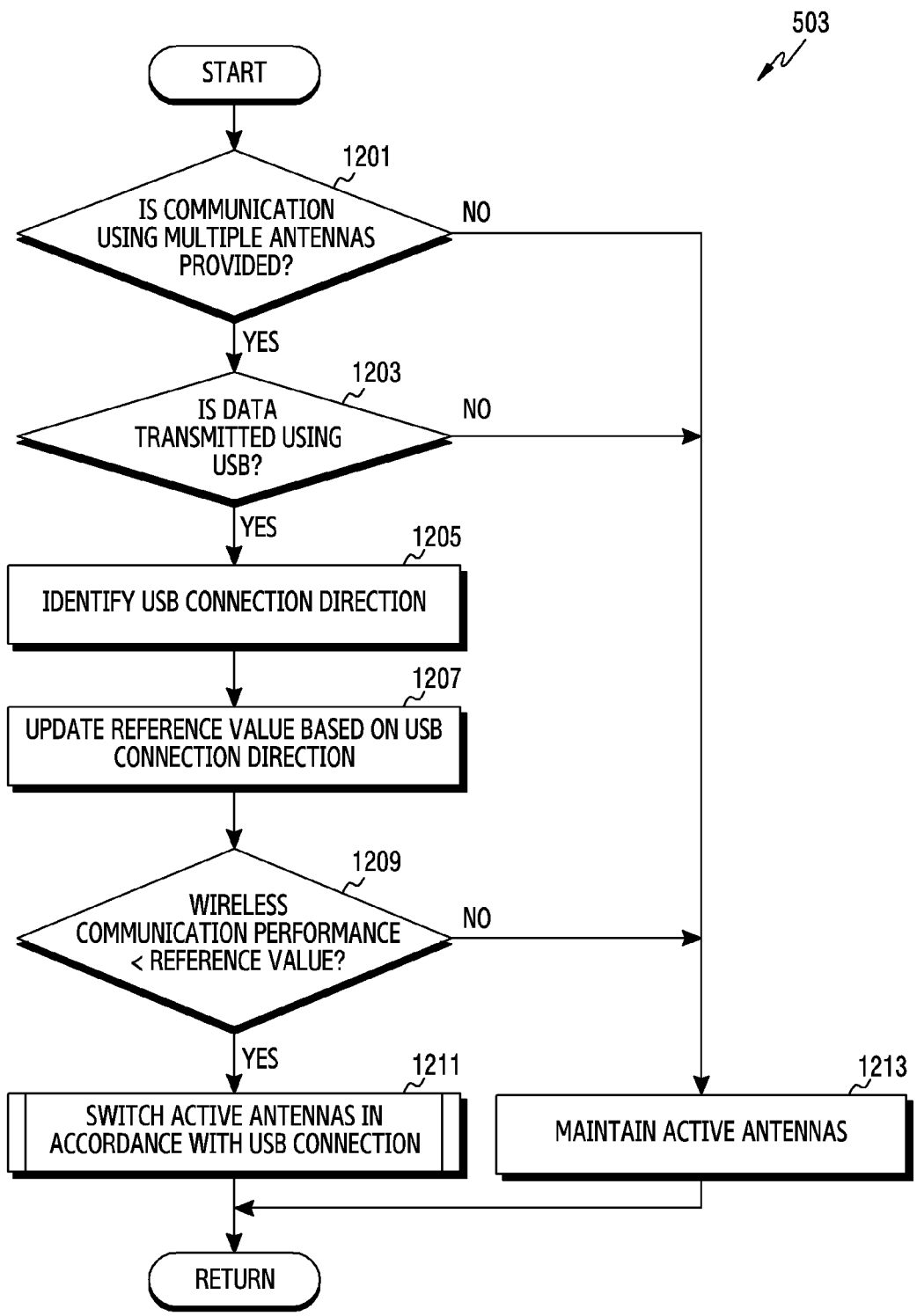
FIG. 12 is a flowchart illustrating a process in which an electronic device updates a reference value for controlling antennas on the basis of the connection direction of a USB cable according to various embodiments of the present disclosure.

FIG. 12 is a flowchart illustrating a process in which the electronic device updates a reference value for controlling antennas on the basis of the connection direction of the USB cable according to various embodiments of the present disclosure. Hereinafter, the operation for providing communication using multiple antennas corresponding to the USB connection in operation 503 of FIG. 5 will be described. Hereinafter, the electronic device may include the entirety or part (for example, the processor 320) of the electronic device 301 of FIG. 3.

Referring to FIG. 12, when the electronic device is connected to the external device via USB (for example, operation 501 of FIG. 5), it may be identified whether communication using multiple antennas is supported by the electronic device on the basis of the serving frequency band of the electronic device in operation 1201. For example, the processor 320 may identify whether the electronic device 301 performs wireless communication through a frequency band in which communication using multiple antennas is not supported.

When the electronic device supports communication using multiple antennas, the electronic device may identify whether data is transmitted/received to/from the external device through the USB connection in operation 1203. For example, the processor 320 may identify whether the electronic device receives data from the external device through the USB cable connected through the connector or transmits data to the external device through the USB cable.

When the electronic device transmits/receives data to/from the external device through the USB connection, the electronic device may identify the connection direction of the USB cable for the connector in operation 1205. For example, the processor 320 may identify whether the USB cable is connected in the first direction (CC1) or the second direction (CC2) through the connector of the communication interface 370.

The electronic device may update a reference value for switching the communication type using multiple antennas on the basis of the connection direction of the USB cable in operation 1207. For example, when the USB cable is connected in the first direction, the processor 320 may update the reference value for switching the communication type using multiple antennas to a first reference value. When the USB cable is connected in the second direction, the processor 320 may update the reference value for switching the communication type using multiple antennas to a second reference value. For example, the second reference value may include an SNR value larger than the first reference value.

The electronic device may identify whether the wireless communication performance of the electronic device is smaller than the reference value for switching the communication type using multiple antennas in operation 1209. For example, the wireless communication performance of the electronic device may include at least an average SNR of antennas activated in the electronic device.

When the wireless communication performance of the electronic device is lower than the reference value for switching the communication type using multiple antennas, the electronic device may switch a plurality of antennas to the active state in order to support communication using the plurality of antennas corresponding to the USB connection in operation 1211. For example, the processor 320 may determine the communication type using multiple antennas corresponding to the USB connection on the basis of the remaining charge of the battery of the electronic device 301, as in operations 701 to 705 of FIG. 7. For example, the processor 320 may determine the communication type using multiple antennas corresponding to the USB connection on the basis of at least one piece of information on quality of service required by the electronic device 301, as in operations 801 to 809 of FIG. 8. The processor 320 may switch, to the active state, the number of antennas corresponding to the communication scheme using multiple antennas among the plurality of antennas electrically connected to the electronic device 301.

When communication using multiple antennas is not supported in the serving frequency of the electronic device, when data is not transmitted/received to/from the external device through the USB connection, or when the wireless communication performance of the electronic device is higher than or equal to the reference value for switching to communication using multiple antennas, the electronic device may maintain the active state of the antennas used for wireless communication in operation 1213. For example, the processor 320 may control at least one antenna to maintain the communication type using at least one antenna.

According to various embodiments of the present disclosure, when the electronic device is connected to the external device via USB, the electronic device may provide communication using multiple antennas corresponding to the USB connection so as to improve wireless communication performance, as shown in [Table 4] below.

TABLE 4

| DUT, [LTE B3] | Throughput [Kbps] @ −85 dBm, QPSK, MCS5, DL 50 RB | Max TIS [dBm] |
|---|---|---|
| Default_No USB 3.0 | 4369 | −99.7 |
| 2 ANT_USB 3.0 | 2107 | −92.1 |
| Better 2 ANT_USB 3.0 | 3012 | −94.3 |
| 4 ANT_USB 3.0 | 3872 | −95.6 |

In [Table 4], when the LTE communication type is used, the electronic device may transmit/receive data through two antennas (for example, Default_No USB 3.0). When the electronic device detects the USB connection to the external device, the performance of wireless communication (for example, 2 ANT) may deteriorate due to interference from USB communication (for example, 2 ANT_USB 3.0). The electronic device may reduce deterioration of the wireless communication performance (for example, Better 2 ANT_USB 3.0 or 4 ANT_USB 3.0) by providing communication (for example, Better 2 ANT or 4 ANT) using multiple antennas corresponding to the USB connection.

According to various embodiments of the present disclosure, when the electronic device is connected to the external device via the USB, the electronic device may update a reference value for switching a communication type using multiple antennas on the basis of USB power management state information. For example, the processor 320 may update the reference value for switching the communication type using multiple antennas in accordance with the power management state of U1 or U2 of the USB.

According to various embodiments of the present disclosure, a method of operating an electronic device may include an operation of identifying whether a wired cable is connected through a connector of the electronic device, and an operation of, when the wired cable is connected through the connector, performing communication using multiple antennas corresponding to the connection of the wired cable.

According to various embodiments, the operation of performing the communication using the multiple antennas may include an operation of, when the wired cable is connected through the connector, switching from first-type communication using a first number of antennas to second-type communication using a second number of antennas among a plurality of antennas electrically connected to the electronic device, and the second number of antennas may include a larger number of antennas than the first number of antennas.

According to various embodiments, the operation of performing the communication using the multiple antennas may include an operation of, when the wired cable is connected through the connector, determining whether to switch a communication type using multiple antennas corresponding to the connection of the wired cable on the basis of at least one of whether data is transmitted through the wired connection and whether communication using multiple antennas is supported in a serving frequency band of the electronic device, and an operation of, when it is determined to switch the communication type using multiple antennas corresponding to the connection of the wired cable, performing communication using the multiple antennas.

According to various embodiments, the wired cable may include a Universal Serial Bus (USB) cable.

According to various embodiments, the operation of performing the communication using the multiple antennas may include an operation of, when the wired cable is connected through connector, updating a reference value for switching a communication type using multiple antennas, an operation of determining whether to switch a communication type using multiple antennas corresponding to the connection of the wired cable on the basis of the wireless communication performance of the electronic device and the updated reference value, and an operation of, when it is determined to switch the communication type using the multiple antennas, performing the communication using the multiple antennas corresponding to the connection of the wired cable.

According to various embodiments, the operation of updating the reference value may include an operation of determining whether to update the reference value on the basis of at least one of whether data is transmitted through connection of the wired cable and whether communication using multiple antennas is supported in the serving frequency band of the electronic device and an operation of, when it is determined to update the reference value, updating the reference value for switching the communication type using multiple antennas on the basis of the connection of the wired cable.

According to various embodiments, the operation of performing the communication using the multiple antennas may include an operation of, when the wired cable is connected through the connector, selecting a communication type using multiple antennas corresponding to the connection of the wired cable on the basis of at least one of a remaining charge of a battery of the electronic device and the quality of service required by the electronic device; and an operation of performing the communication using the selected multiple antennas.

An electronic device and a method of operating the same according to various embodiments can reduce deterioration of the performance of wireless communication due to connection of a wired cable by selecting at least one antenna to be used for wireless communication on the basis of at least one of whether a wired cable (for example, a USB cable) is connected, power management state information of a wired connection (for example, USB connection), whether communication using multiple antennas is supported in a serving frequency band, and connection direction information of the wired cable.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 430) in the form of a program module. The instruction, when executed by a processor (e.g., the processor 420), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned components or may further include other additional components, or some of the aforementioned components may be omitted.

The embodiments disclosed herein are proposed to help with description and comprehension of disclosed technical contents, and do not limit the scope of various embodiments of the present disclosure. Therefore, the scope of the various embodiments of the present disclosure should be construed as including all modifications or various other embodiments based on the spirit and scope of the various embodiments of the present disclosure.

The invention claimed is:

1. An electronic device comprising;
   a plurality of antennas;
   a communication circuit electrically connected to the plurality of antennas;
   a connector; and
   at least one processor,
   wherein the processor;
      performs control to identify whether a wired cable is connected through the connector,
      performs communication using at least two antennas corresponding to the connection of the wired cable when the wired cable is connected through the connector,
      updates a reference value based on a connection direction of the wired cable, and
      switches the antennas to an active state corresponding to the connection when performance of the electronic device is lower than the reference value, otherwise maintaining the active state of the antennas for a different performance level.

2. The electronic device of claim 1, wherein, when the wired cable is connected through the connector, the processor performs control to switch from first-type communication using a first number of antennas to second-type communication using a second number of antennas among the plurality of antennas, and the second number of antennas includes a larger number of antennas than the first number of antennas.

3. The electronic device of claim 1, wherein, when the wired cable is connected through the connector, the processor determines whether to switch a communication type using multiple antennas corresponding to the connection of the wired cable, based on at least one of whether data is transmitted through the wired cable and whether communication using multiple antennas is supported in a serving frequency band of the electronic device, and when it is determined to switch the communication type using multiple antennas corresponding to the connection of the wired cable, switches antennas corresponding to the communication type using multiple antennas among the plurality of antennas to an active state.

4. The electronic device of claim 1, wherein the wired cable includes a Universal Serial Bus (USB) cable.

5. The electronic device of claim 1, wherein, when the wired cable is connected through the connector, the processor updates a reference value for switching a communication type using multiple antennas, and when it is determined to switch a communication type using multiple antennas corresponding to the connection of the wired cable, based on wireless communication performance of the electronic device and the updated reference value, switches antennas corresponding to the communication type using the multiple antennas among the plurality of antennas to an active state.

6. The electronic device of claim 5, wherein the processor determines whether to update the reference value, based on at least one of whether data is transmitted through the wired cable and whether communication using multiple antennas is supported in a serving frequency band of the electronic device, and when it is determined to update the reference value, updates the reference value for switching the communication type using multiple antennas based on the connection of the wired cable.

7. The electronic device of claim 1, wherein the processor selects a communication type using multiple antennas corresponding to the connection of the wired cable based on at least one of a remaining charge of a battery of the electronic device and a quality of service required by the electronic device.

8. The electronic device of claim 1, wherein, when the wired cable is connected through the connector, the processor performs control to perform communication using at least two antennas corresponding to the connection of the wired cable based on a connection direction of the wired cable.

9. A method of operating an electronic device, the method comprising:
   identifying whether a wired cable is connected through a connector of the electronic device;
   when the wired cable is connected through the connector, performing communication using multiple antennas corresponding to a connection of the wired cable;
   updating a reference value based on a connection direction of the wired cable; and
   switching the antennas to an active state corresponding to the connection when performance of the electronic device is lower than the reference value, otherwise maintaining the active state of the antennas for a different performance level.

10. The method of claim 9, wherein the performing of the communication using the multiple antennas comprises, when the wired cable is connected through the connector, switching from first-type communication using a first number of antennas to second-type communication using a second number of antennas among a plurality of antennas electrically connected to the electronic device, and the second number of antennas includes a larger number of antennas than the first number of antennas.

11. The method of claim 9, wherein the performing of the communication using the multiple antennas comprises:
   when the wired cable is connected through the connector, determining whether to switch a communication type using multiple antennas corresponding to the connection of the wired cable, based on at least one of whether data is transmitted through the wired connection and whether communication using multiple antennas is supported in a serving frequency band of the electronic device; and
   when it is determined to switch the communication type using multiple antennas corresponding to the connection of the wired cable, performing communication using multiple antennas corresponding to the connection of the wired cable.

12. The method of claim 9, wherein the wired cable includes a Universal Serial Bus (USB) cable.

13. The method of claim 9, wherein the performing of the communication using the multiple antennas comprises:
   when the wired cable is connected through connector, updating a reference value for switching a communication type using multiple antennas;

determining whether to switch a communication type using multiple antennas corresponding to the connection of the wired cable based on wireless communication performance of the electronic device and the updated reference value; and when it is determined to switch the communication type using the multiple antennas, performing the communication using the multiple antennas corresponding to the connection of the wired cable.

14. The method of claim 13, wherein the updating of the reference value comprises:

determining whether to update the reference value based on at least one of whether data is transmitted through the connection of the wired cable and whether communication using multiple antennas is supported in a serving frequency band of the electronic device; and when it is determined to update the reference value, updating the reference value for switching the communication type using multiple antennas based on the connection of the wired cable.

15. The method of claim 9, wherein the performing of the communication using the multiple antennas comprises:

when the wired cable is connected through the connector, selecting a communication type using multiple antennas corresponding to the connection of the wired cable based on at least one of a remaining charge of a battery of the electronic device and a quality of service required by the electronic device; and performing the communication using the multiple antennas corresponding to the communication type using the multiple antennas.

16. An electronic device comprising:

a plurality of antennas;

a communication circuit connected to the plurality of antennas;

a connector; and at least one processor, wherein the processor configured to:

identify whether a wired cable is connected through the connector, perform, in response to identifying that the wired cable is connected through the connector, communication using multiple antennas corresponding to the connection of the wired cable based on a connection direction of the wired cable, update a reference value based on the connection direction, and switch the antennas to an active state corresponding to the connection when performance of the electronic device is lower than the reference value, otherwise maintaining the active state of the antennas for a different performance level.

17. The electronic device of claim 16, wherein the processor configured to detect, in a state that the wired cable includes a Universal Serial Bus (USB) cable, the connection direction based on voltages applied to pins CC1 and CC2 of the connector associated with the USB cable.

18. The electronic device of claim 16, wherein the processor configured to:

switch, in a state that the wired cable is connected in a first direction through the connector, a communication scheme using multiple antennas corresponding to the connection of the wired cable, and maintain, in a state that the wired cable is connected in a second direction through the connector, a communication type using at least one antenna.

19. The electronic device of claim 16, wherein the processor configured to differently update a reference value for switching a communication type using multiple antennas corresponding to the connection of the wired cable in accordance with the connection direction of the wired cable.

20. The electronic device of claim 16, wherein the processor configured to:

determine whether to update a reference value based on at least one of whether data is transmitted through the wired cable and whether communication using multiple antennas is supported in a serving frequency band of the electronic device, and update, in response to identifying that the reference value is determined to be updated, the reference value for switching a communication type using multiple antennas based on the connection of the wired cable.

* * * * *